US012581227B2

(12) United States Patent
Zhu et al.

(10) Patent No.: US 12,581,227 B2
(45) Date of Patent: Mar. 17, 2026

(54) VIBRATION PLATES

(71) Applicant: SHENZHEN SHOKZ CO., LTD., Shenzhen (CN)

(72) Inventors: Guangyuan Zhu, Shenzhen (CN); Peigeng Tong, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 139 days.

(21) Appl. No.: 18/433,369

(22) Filed: Feb. 5, 2024

(65) Prior Publication Data

US 2024/0205589 A1 Jun. 20, 2024

Related U.S. Application Data

(63) Continuation of application No. PCT/CN2022/082107, filed on Mar. 21, 2022.

(51) Int. Cl.
*H04R 1/10* (2006.01)
*H04R 9/02* (2006.01)
*H04R 9/06* (2006.01)

(52) U.S. Cl.
CPC ........... *H04R 1/1091* (2013.01); *H04R 9/025* (2013.01); *H04R 9/06* (2013.01)

(58) Field of Classification Search
CPC ........ H04R 1/1091; H04R 9/025; H04R 9/06; H04R 9/066; H04R 2460/13; H04R 7/12; H04R 1/10; H04R 9/045; H04R 9/046; H04R 11/02; B06B 1/045
See application file for complete search history.

(56) References Cited

U.S. PATENT DOCUMENTS

2009/0304209 A1 12/2009 Nakatani
2012/0169153 A1 7/2012 Ueda et al.
2020/0336824 A1 10/2020 Zheng et al.

FOREIGN PATENT DOCUMENTS

CN 101931837 A 12/2010
CN 203708473 U 7/2014
CN 204968095 U 1/2016
(Continued)

OTHER PUBLICATIONS

International Search Report in PCT/CN2022/082107 mailed on Oct. 10, 2022, 7 pages.
(Continued)

*Primary Examiner* — Angelica M McKinney
(74) *Attorney, Agent, or Firm* — METIS IP LLC

(57) ABSTRACT

Embodiments of the present disclosure provide a vibration plate including a ring structure, vibrating member, and a plurality of rods. A central region of the ring structure is a hollow-out region. The vibrating member is configured to be connected with a magnetic circuit system, and the vibrating member is located in the hollow-out region of the ring structure. The plurality of rods is configured to connect the ring structure to the vibrating member, and the plurality of rods is arranged at intervals along a circumferential direction of the vibrating member. At least one rod in the plurality of rods includes at least two curved portions, and curvature centers of the at least two curved portions are located on two sides of the at least one rod.

19 Claims, 15 Drawing Sheets

100

(56) References Cited

FOREIGN PATENT DOCUMENTS

| | | | | | |
|---|---|---|---|---|---|
| CN | 205491139 | U | | 8/2016 | |
| CN | 208739410 | U | | 4/2019 | |
| CN | 209710308 | U | | 11/2019 | |
| CN | 210225707 | U | | 3/2020 | |
| CN | 212544041 | U | * | 2/2021 | ............... H04R 7/12 |
| CN | 214315600 | U | | 9/2021 | |
| CN | 214708005 | U | | 11/2021 | |
| CN | 113873381 | A | * | 12/2021 | ........... H04R 1/1058 |
| WO | 2016197412 | A1 | | 12/2016 | |

OTHER PUBLICATIONS

Written Opinion in PCT/CN2022/082107 mailed on Oct. 10, 2022, 6 pages.

* cited by examiner

VIBRATION PLATES

CROSS-REFERENCE TO RELATED APPLICATIONS

This specification is a continuation of International Application No. PCT/CN2022/082107, filed on Mar. 21, 2022, the entire contents of which are hereby incorporated by reference in its entirety.

TECHNICAL FIELD

The present disclosure relates to the field of bone conduction devices, and in particular, to a vibration plate suitable for a bone conduction earphone.

BACKGROUND

The vibration plate, as an important part of the bone conduction earphone, may transmit the vibration generated by the vibration part in the bone conduction earphone to the housing. The vibration is then transmitted through the human skin, subcutaneous tissues, and bones to the auditory nerve so that the user can hear the sound. Since the vibration plate is connected to the magnetic circuit system of the bone conduction earphone, when the bone conduction earphone is working, the vibration plate is always vibrating under the action of the magnetic circuit system, which often causes the vibration plate to break. This will directly affect the quality of the bone conduction earphone, and even result in the failure of the bone conduction earphone to function normally.

Therefore, it is desired to provide a vibration plate with high structural reliability so as to increase the service life of the vibration plate.

SUMMARY

One of the embodiments of the present disclosure provides a vibration plate including a ring structure, a vibrating member, and a plurality of rods. A central region of the ring structure may be a hollow-out region. The vibrating member may be configured to be connected with a magnetic circuit system and may be located in the hollow-out region of the ring structure. The plurality of rods may be configured to connect the ring structure to the vibrating member and may be arranged at intervals along a circumferential direction of the vibrating member. At least one rod in the plurality of rods may include at least two curved portions, and curvature centers of the at least two curved portions may be located on two sides of the at least one rod.

In some embodiments, at least one of the plurality of rods may include at least three curved portions.

In some embodiments, each of the plurality of rods may have a fiber structure, and an included angle between a tangent direction at a location of a region with maximum curvature on the at least one rod and an extension direction of the fiber structure may be within a range of 0°-30°.

In some embodiments, when the vibrating member vibrates in a direction perpendicular to a plane in which the vibrating member is located, a difference between a maximum displacement value of a surface of the vibrating member and a minimum displacement value of the surface of the vibrating member may be less than 0.3 mm in the direction perpendicular to the plane in which the vibrating member is located.

In some embodiments, the at least one rod may include a plurality of transition portions, inner normal directions corresponding to connecting portions at two ends of each of the plurality of transition portions may point to two sides of the at least one rod, respectively.

In some embodiments, two ends of at least one transition portion may be connected with the at least two curved portions of the at least one rod.

In some embodiments, each of the plurality of rods may include at least one curved portion having a curvature of 2-10.

In some embodiments, the hollow-out region may have a length direction and a width direction, and a length of each of the plurality of rods may be greater than 50% of a maximum dimension of the hollow-out region along the length direction.

In some embodiments, the maximum dimension of the hollow-out region may be within a range of 8-20 mm along the length direction; and the maximum dimension of the hollow-out region may be within a range of 3-8 mm along the width direction.

In some embodiments, a ratio of the maximum dimension of the hollow-out region along the length direction to the maximum dimension of the hollow-out region along the width direction may be within a range of 1.5-3.

In some embodiments, each of the plurality of rods may have a different length.

In some embodiments, the plurality of rods may include a first rod, a second rod, and a third rod. The first rod, the second rod, and the third rod may be sequentially arranged at intervals along the circumferential direction of the vibrating member. A ratio of a length of the first rod to the maximum dimension of the hollow-out region along the length direction may be within a range of 75%-85%. A ratio of a length of the second rod to the maximum dimension of the hollow-out region along the length direction may be within a range of 85%-96%. A ratio of a length of the third rod to the maximum dimension of the hollow-out region along the length direction may be within a range of 70%-80%.

In some embodiments, a contact point between the first rod and the vibrating member may be connected with a center of the vibrating member by a first connecting line. The contact point between the second rod and the vibrating member may be connected with the center of the vibrating member by a second connecting line. The contact point between the third rod and the vibrating member may be connected with the center of the vibrating member by a third connecting line. An included angle between the first connecting line and the second connecting line or an included angle between the first connecting line and the third connecting line may be greater than an included angle between the second connecting line and the third connecting line.

In some embodiments, the included angle between the first connecting line and the second connecting line may be within a range of 100°-140°, the included angle between the second connecting line and the third connecting line may be within a range of 70°-100°, and the included angle between the first connecting line and the third connecting line may be within a range of 120°-160°.

In some embodiments, a width of each of the plurality of rods may be not less than 0.25 mm.

In some embodiments, a width of each of the plurality of rods may be not less than 0.28 mm.

In some embodiments, the vibration plate may have a resonant peak in a frequency range of 50 Hz-2000 Hz when vibrating along a direction perpendicular to a plane of the vibration plate.

In some embodiments, an elastic coefficient provided by the plurality of rods to the vibrating member along a length direction may be within a range of 50 N/m-70,000 N/m.

In some embodiments, each connection region connecting the plurality of rods and the vibrating member or the ring structure may have a rounded corner.

One of the embodiments of the present disclosure provides a bone conduction earphone including a housing structure, a magnetic circuit structure, and a vibration plate in any of the above embodiments. The housing structure may have an accommodating space, wherein the magnetic circuit structure and the vibration plate may be located within the accommodating space. A ring structure of the vibration plate may be circumferentially connected with an inner wall of the housing structure, wherein the magnetic circuit structure may be connected with a vibrating member of the vibration plate.

DETAILED DESCRIPTION

Figure 1:
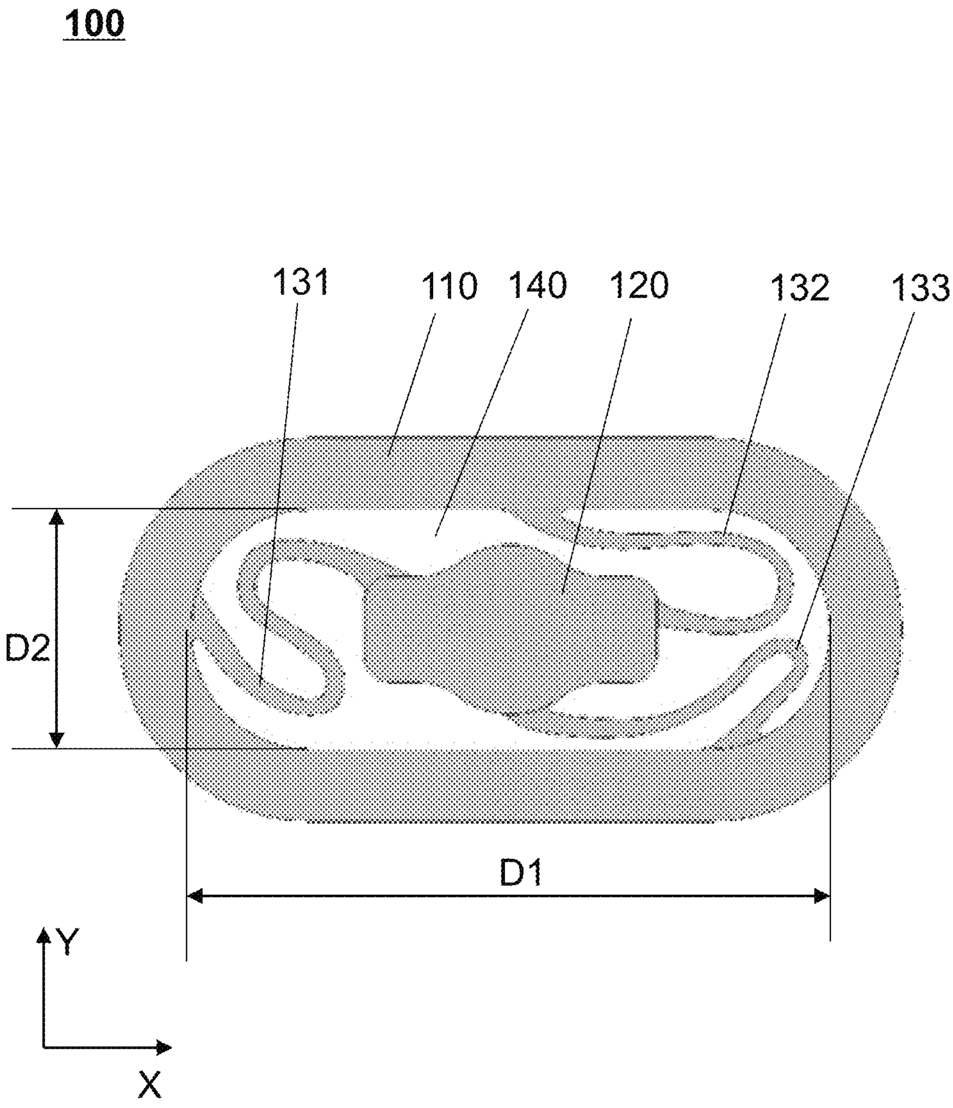
FIG. 1 is a schematic diagram illustrating a structure of a vibration plate according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

Embodiments of the present disclosure provide a vibration plate, which may include a ring structure, a vibrating member connected to a magnetic circuit system, and a plurality of rods configured to connect the ring structure and the vibrating member. A central region of the ring structure may be a hollow-out region, the vibrating member may be located in the hollow-out region of the ring structure, and the plurality of rods may be arranged at intervals along a circumferential direction of the vibrating member. In some embodiments, one rod of the plurality of rods may include at least two curved portions, and curvature centers of the at least two curved portions may be located on two sides of the rod. Such arrangement may reduce an elastic coefficient of the vibration plate in a direction of a load that causes failures (plastic deformation or fracture) of the vibration plate, improve the fatigue resistance of the vibration plate, and reduce the risk of failure of the vibration plate.

FIG. 1 is a schematic diagram illustrating a structure of a vibration plate according to some embodiments of the present disclosure. As shown in FIG. 1, in some embodiments, the vibration plate 100 may include a ring structure 110, a vibrating member 120, and a plurality of rods for connecting the ring structure 110 and the vibrating member 120. In some embodiments, a shape (a shape of an outer contour) of the ring structure 110 may be a racetrack as shown in FIG. 1, or a regular shape such as a circle, an oval, a triangle, a quadrilateral, a pentagon, a hexagon, etc., or any other irregular shape. In some embodiments, the central region of the ring structure 110 may be a hollow-out region 140. A shape of the hollow-out region 140 may be considered as a shape of an inner contour of the ring structure 110. In some embodiments, the shape of the inner contour and the shape of the outer contour of the ring structure 110 may be the same. For example, as shown in FIG. 1, the shape of the outer contour of the ring structure 110 is a racetrack, and the shape of the hollow-out region 140 (the inner contour of the ring structure) is also a racetrack. Further, the hollow-out region 140 has a length direction (i.e., an X direction shown in FIG. 1) and a width direction (i.e., a Y direction shown in FIG. 1). In some embodiments, the shape of the hollow-out region 140 may be different from the shape of the outer contour of the ring structure 110. For example, the shape of the outer contour of the ring structure 110 may be a racetrack, while the shape of the hollow-out region 140 may be other shapes such as a circle, a rectangle, etc.

In some embodiments, the vibration plate 100 may be made of a metallic material, which may include but is not limited to, steel (e.g., stainless steel, carbon steel, etc.), lightweight alloys (e.g., aluminum alloy, beryllium copper, magnesium alloy, titanium alloy, etc.). In some embodiments, the vibration plate 100 may also be made of other single or composite materials that may have the same properties. For example, the composite materials may include but are not limited to, reinforcing materials such as glass fibers, carbon fibers, boron fibers, graphite fibers, silicon carbide fibers, aramid fibers, etc.

In some embodiments, the vibrating member 120 is located in the hollow-out region 140, and is configured to be connected with a magnetic circuit system (not shown in the figure). In some embodiments, as shown in FIG. 1, the vibrating member 120 may have a structure that is left-right symmetrical and also up-down symmetrical. In some embodiments, the shape of the vibrating member 120 may be regular or irregular shapes such as a circular, a triangular, a quadrilateral, a pentagonal, a hexagonal, etc. In some embodiments, the shape of the vibrating member 120 may be the same as the shape of the ring structure 110. For example, the shape of both the ring structure 110 and the vibrating member 120 may be circular, i.e., the ring structure 110 and the vibrating member 120 may form concentric circles. In some embodiments, the magnetic circuit system may be connected to one of surfaces of the vibrating member 120, and the connecting manner may include but is not limited to, gluing, welding, snap-fitting, pin-fitting, bolting, etc.

In some embodiments, a plurality of rods may be located in the hollow-out region 140 between the ring structure 110 and the vibrating member 120. When the vibration plate 120 is operating, the vibration of the magnetic circuit system may drive the vibrating member 120 to vibrate along a direction (i.e., a direction perpendicular to a paper surface in the figure) of a plane in which the vibration plate 100 is located (also referred to "a plane of the vibration plate 100"). Thus, the vibration generated by the magnetic circuit system may be transmitted to a housing of the bone conduction earphone through the vibration plate 100, and the vibration of the housing may be transmitted to the auditory nerves of a user through the bones, blood, and muscles of the head of the user, so that the user may hear the sound.

In some embodiments, the vibration plate 100 may be of a one-piece structure. For example, the vibration plate 100 may be manufactured by one-piece molding such as injection molding, casting, 3D printing, etc. As another example, the vibration plate 100 may be manufactured by cutting out the ring structure 110, the vibrating member 120, and the plurality of rods by performing laser cutting, etc., on a sheet material. In some embodiments, the vibration plate 100 may be a split structure. For example, the ring structure 110, the vibrating member 120, and the plurality of rods may be connected to form the vibration plate 100 by gluing, welding, snap-fitting, etc.

In some embodiments, there may be a plurality of rods in the vibration plate 100 for realizing the connection between the ring structure 110 and the vibrating member 120. In some embodiments, a count of rods in the vibration plate may be 3 to 5, which ensures that the vibration plate 100 has better stability, is less susceptible to skewing, and is more reliable during operation. The skewing refers to a situation where a plane in which the vibrating member 120 is located is not parallel to a plane in which the ring structure 110 is located, i.e., an angle between the two planes is in an abnormal state. Abnormal vibrations may be produced in the abnormal state during the operating process of the vibration plate 100, which is not conducive to exhibiting a normal sound quality of the bone conduction earphone.

Figure 2:
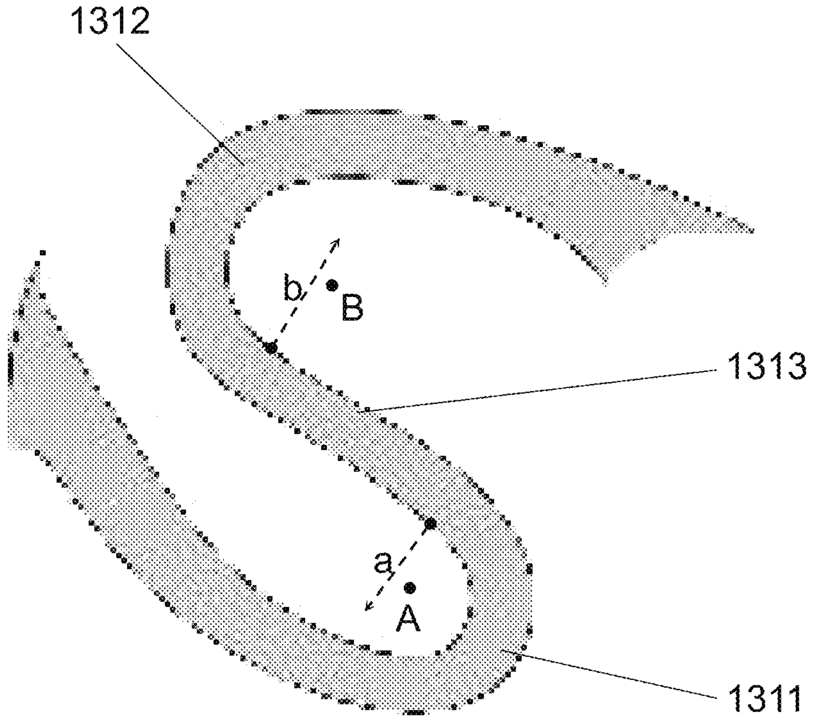
FIG. 2 is a schematic diagram illustrating a structure of a first rod according to some embodiments of the present disclosure.

In some embodiments, the plurality of rods for connecting the ring structure 110 with the vibrating member 120 may include a first rod 131, a second rod 132, and a third rod 133. The first rod 131, the second rod 132, and the third rod 133 are arranged at intervals along a circumferential direction of the vibrating member 120. In some embodiments, at least one of the plurality of rods may have at least two curved portions. For example, the first rod 131 may have two curved portions, and the second rod 132 and the third rod 133 may both have one curved portion. As another example, the first rod 131 may have two curved portions, the second rod 132 may have three curved portions, and the third rod 133 may have two curved portions. As shown in FIG. 2, FIG. 2 is a schematic diagram illustrating a structure of a first rod according to some embodiments of the present disclosure. The first rod 131 is taken as an example, the first rod 131 has a first curved portion 1311 and a second curved portion 1312. A curvature center A of the first curved portion 1311 and a curvature center B of the second curved portion are located on two sides of the first rod 131, respectively. It should be noted that the curved portion in the present disclosure may be understood as a portion of the rod where bending occurs. A curvature of the curved portion refers to a maximum curvature of the curved portion, and the curvature center of the curved portion refers to a curvature center of a region with the maximum curvature.

In some embodiments, the rods (e.g., the first rod 131, the second rod 132, and the third rod 133) may be made "softer" by decreasing an elastic coefficient of the rods in a particular direction (e.g., a length direction of the hollow-out region 140), which may effectively reduce the impact of the load on the rods in the particular length direction, thereby increasing a service life of the vibration plate 100. Merely by way of example, by providing one or more curved portions whose curvature satisfies a certain condition, a length of the rod may be increased, thereby effectively reducing the elastic coefficient of the rod in the length direction of the hollow-out region. For example, each of the first rod 131, the second rod 132, and the third rod 133 may include at least one curved portion with a curvature of 2 mm 1-10 $mm^{-1}$. As another example, each of the first rod 131, the second rod 132, and the third rod 133 may include at least one curved portion with a curvature of 4 $mm^{-1}$-10 $mm^{-1}$. As another example, each of the first rod 131, the second rod 132, or the third rod 133 may include at least one curved portion with a curvature of 6 $mm^{-1}$-10 $mm^{-1}$. The greater the curvature of the curved portion, the greater the degree of curvature. Therefore, the count of curved portions of the rod may be increased in a limited space, thus the length of the rod may be increased, and the elastic coefficient of the rod in the length direction of the hollow-out region may be better reduced. In some embodiments, the curvature of at least one of the first curved portion 1311 and the second curved portion 1312 may be 2 $mm^{-1}$-10 $mm^{-1}$.

In some embodiments, each of the rods may further include a transition portion, the transition portion may be connected between two curved portions, and inner normal directions corresponding to connecting portions at two ends of the transition portion point to two sides of the rod, respectively. As shown in FIG. 2, the first rod 131 is taken as an example. The first rod 131 may include a transition portion 1313, and two ends of the transition portion 1313 may be connected with the first curved portion 1311 and the second curved portion 1312, respectively. An inner normal direction corresponding to a portion connecting the first curved portion 1311 and the transition portion 1313 is shown by arrow a, and an inner normal direction corresponding to a portion connecting the second curved portion 1312 and the transition portion 1313 is shown by arrow b. The inner normal direction a and the inner normal direction b then point to the two sides of the first rod 131, respectively. It should be noted that the transition portion in the present disclosure may be understood as a portion of the rod on which a curvature is less than a certain threshold (e.g., the threshold of 4 $mm^{-1}$) that may be approximated as a straight line.

As shown in FIG. 1, the position of the curved portion, the curvature of the curved portion, and the position of the transition portion of each of the first rod 131, the second rod 132, and the third rod 133 are different, and intervals of two neighboring rods along the circumferential direction of the vibrating member 120 are also different. By arranging the first rod, the second rod, and the third rod asymmetrically, a problem of collision and rattling in the housing may be effectively solved when the magnetic circuit system connected with the vibrating member 120 shakes. In addition, the arrangement of the curved portion may reduce a size of the vibration plate 100 (e.g., the size in the X direction as shown in FIG. 1), which enables the vibration plate 100 to be better arranged in a narrow space and allows the rod to meander in a limited space, which reduces the elastic coefficient of the rod in the X direction, thereby reducing the impact of the load on the vibrating member 100 in the X direction, and reducing a risk of fracture of the rod. More description regarding the arrangement of the curved portion for reducing the risk of fracture of the rod may be found elsewhere in the present disclosure, and may not be repeated here.

It should be noted that the count of the rods, the count of the curved portions in the first rod 131, and the count of the transition portions in FIG. 1 are only used for exemplary descriptions, and do not constitute limitations thereon. In some embodiments, the count of the rods in the vibration plate 100 may also be more than three. For example, the vibration plate may also include a fourth rod or a fifth rod, etc. In some embodiments, the first rod 131 may also include a third curved portion, a fourth curved portion, etc.

Figure 3A:
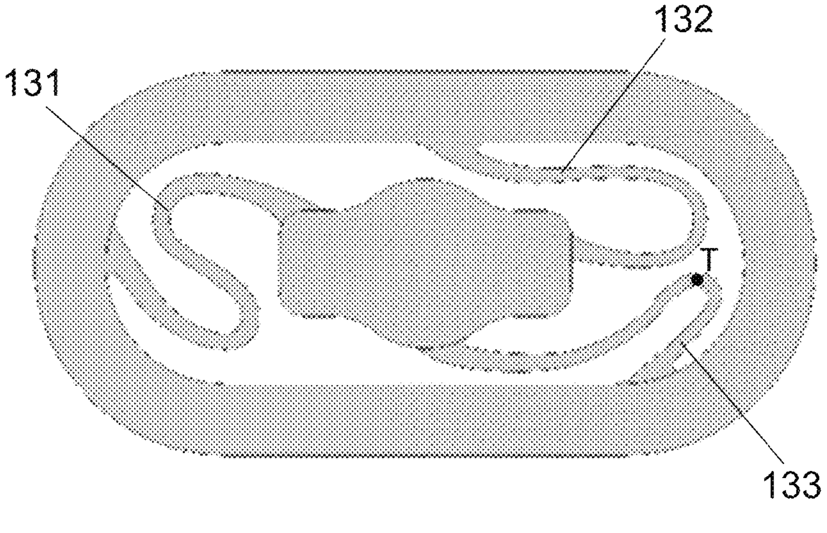
FIG. 3A is a schematic diagram illustrating a failure mode of a vibration plate according to some embodiments of the present disclosure.
Figure 3B:
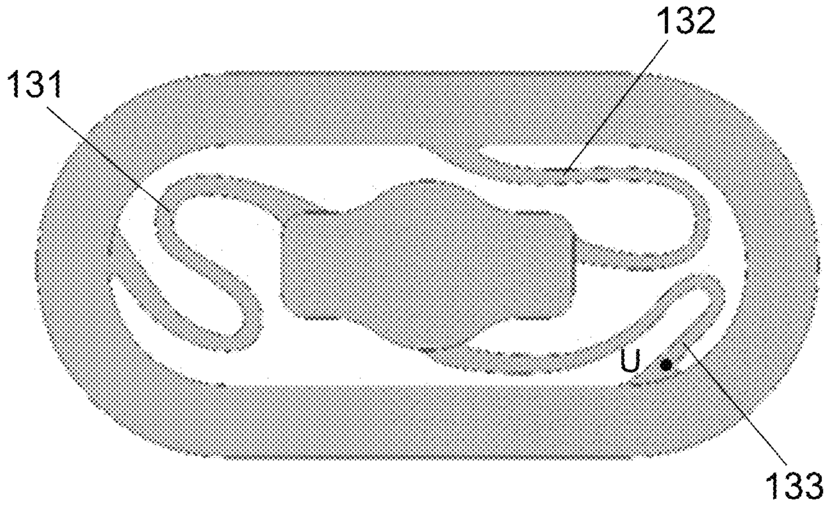
FIG. 3B is a schematic diagram illustrating a failure mode of a vibration plate according to some embodiments of the present disclosure.

In some embodiments, the vibration plate 100 may be applied to a bone conduction earphone, and a roller experiment may be conducted to verify the structural reliability of the vibration plate 100. On such a basis, the design of the vibration plate 100 may be further improved. FIG. 3A and FIG. 3B are schematic diagrams illustrating a failure mode of a vibration plate according to some embodiments of the present disclosure. In some embodiments, the vibration plate 100 may include the following failure modes: (1) as shown in FIG. 3A, the curved portion (i.e., at position T) of the third rod 133 breaks; (2) as shown in FIG. 3B, the connection region (i.e., at position U) connecting the third rod 133 and the ring structure 110 breaks; (3) the plastic deformation of the second rod 132 and the third rod 133 occurs. By counting the count of products and/or samples corresponding to various failure modes, it can be found that the proportion of the vibration plates 100 that break at the curved portion of the third rod 133 is the highest (i.e., the main failure mode), followed by the vibration plates 100 that break at the connection region between the third rod 133 and the ring structure 110 (i.e., the secondary failure mode). A small amount of the vibration plates 100 occur plastic deformation of the second rod 132 and the third rod 133. Based on this, it can be seen that the third rod 133 is the most hazardous rod that is most likely to cause the failure of the vibration plate 100.

In some embodiments, loads to which the vibration plate 100 is subjected during operation may be classified, according to directions, as a load in a length direction of the hollow-out region, a load in a width direction of the hollow-out region, a load in an axial direction (i.e., a load in a direction perpendicular to the plane in which the vibrating member 120 is located), and a load in a flipping direction (a load that causes the vibration plate 100 to flip around the length direction of the hollow-out region). By performing a unidirectional load fatigue simulation on the vibration plate 100, distributions of stresses and the count of fatigue failure cycles of the vibration plate 100 may be investigated under the loads in the above various directions, thereby determining the main reason for the fracture of the vibration plate 100 to facilitate the improvement and optimization of the vibration plate 100.

Figure 4A:
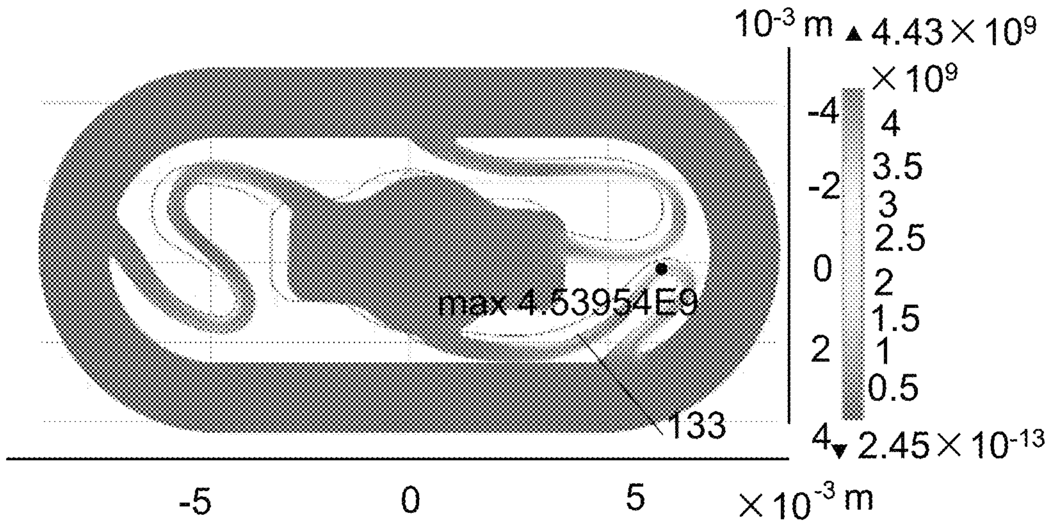
FIG. 4A is a schematic diagram illustrating a stress distribution of a vibration plate under a load along a length direction of a hollow-out region according to some embodiments of the present disclosure.
Figure 4B:
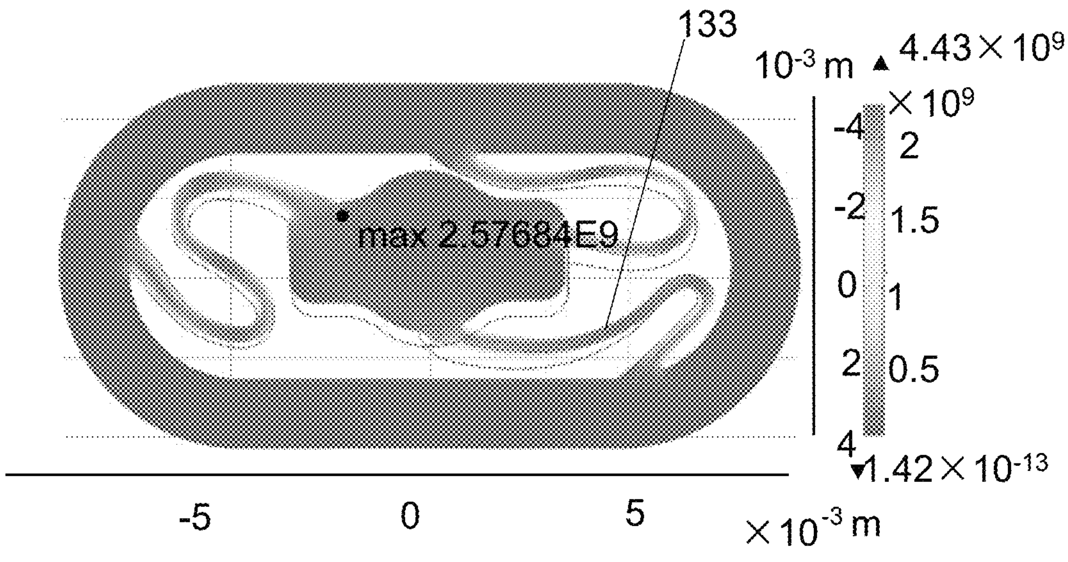
FIG. 4B is a schematic diagram illustrating a stress distribution of a vibration plate under a load along a width direction of a hollow-out region according to some embodiments of the present disclosure.
Figure 4C:
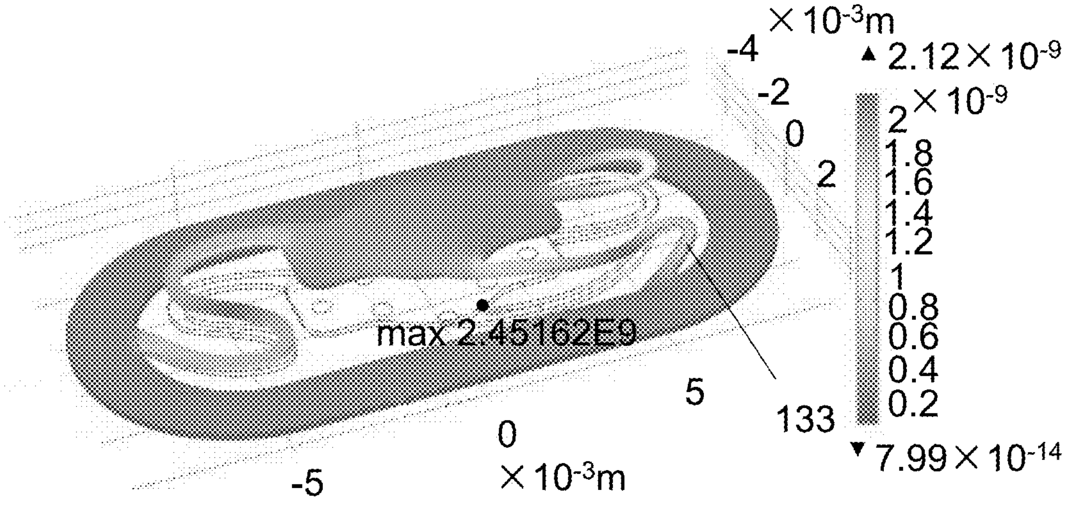
FIG. 4C is a schematic diagram illustrating a stress distribution of a vibration plate under a load along an axial direction according to some embodiments of the present disclosure.
Figure 4D:
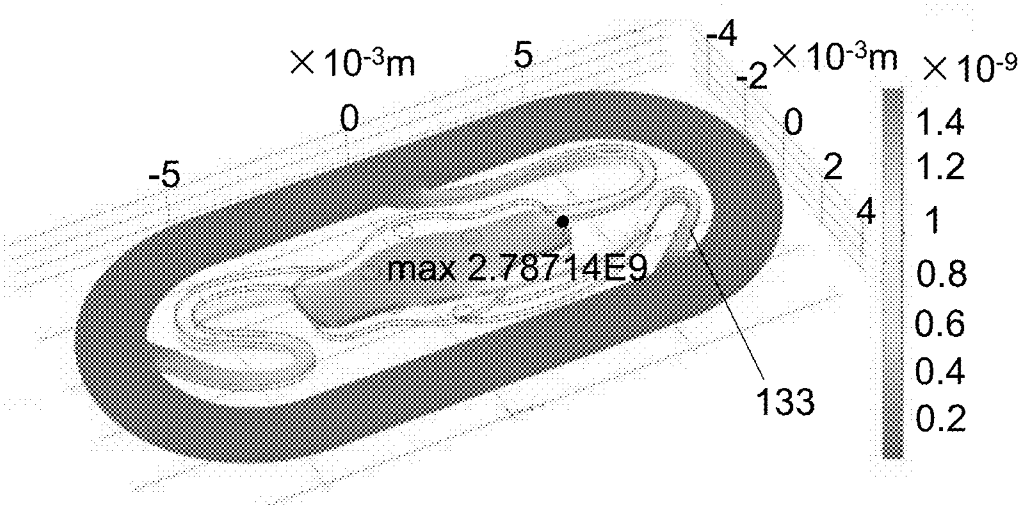
FIG. 4D is a schematic diagram illustrating a stress distribution of a vibration plate under a load along a flipping direction according to some embodiments of the present disclosure.
Figure 5A:
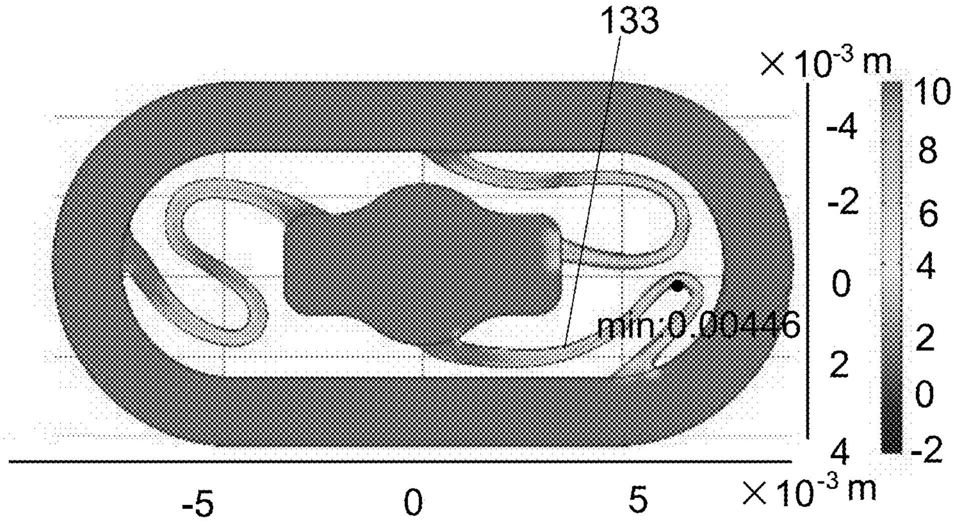
FIG. 5A is a schematic diagram illustrating a distribution of counts of fatigue failures of a vibration plate under a load along a length direction of a hollow-out region according to some embodiments of the present disclosure.
Figure 5B:
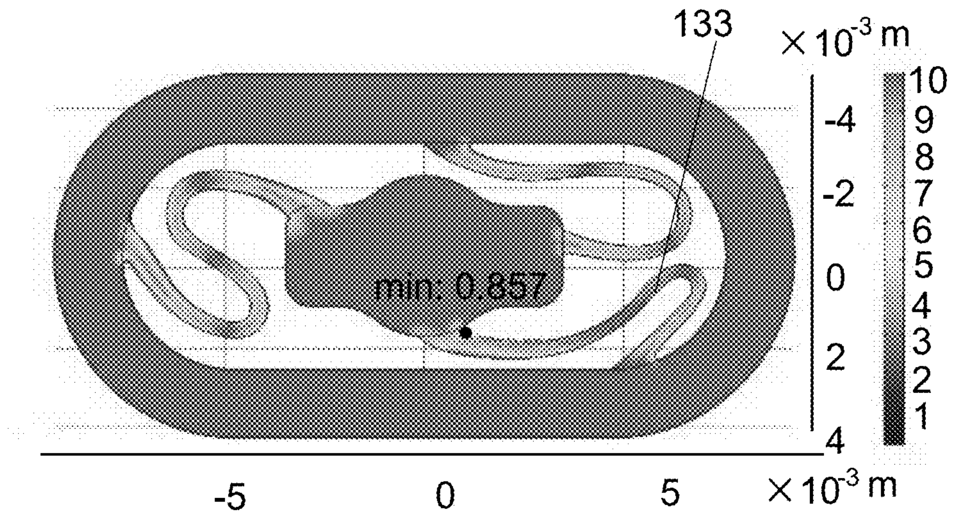
FIG. 5B is a schematic diagram illustrating a distribution of counts of fatigue failures of a vibration plate under a load along a width direction of a hollow-out region according to some embodiments of the present disclosure.
Figure 5C:
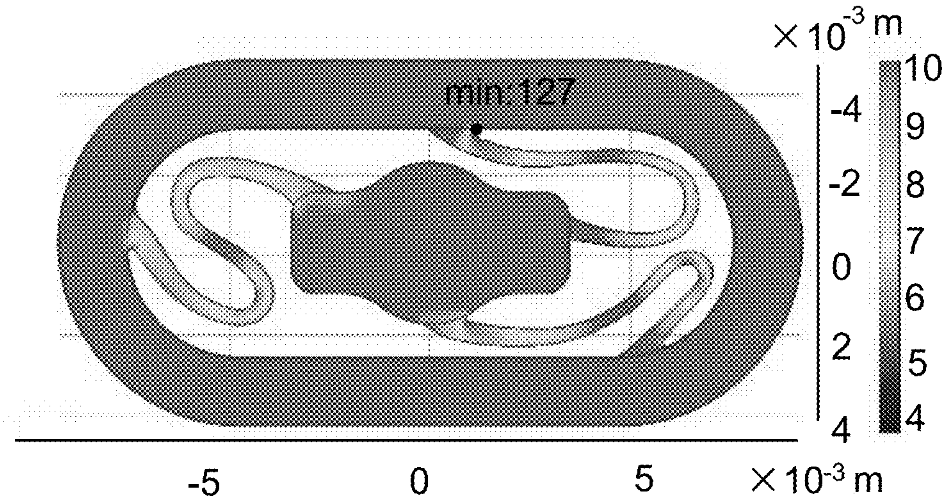
FIG. 5C is a schematic diagram illustrating a distribution of counts of fatigue failures of a vibration plate under a load along an axial direction according to some embodiments of the present disclosure.
Figure 5D:
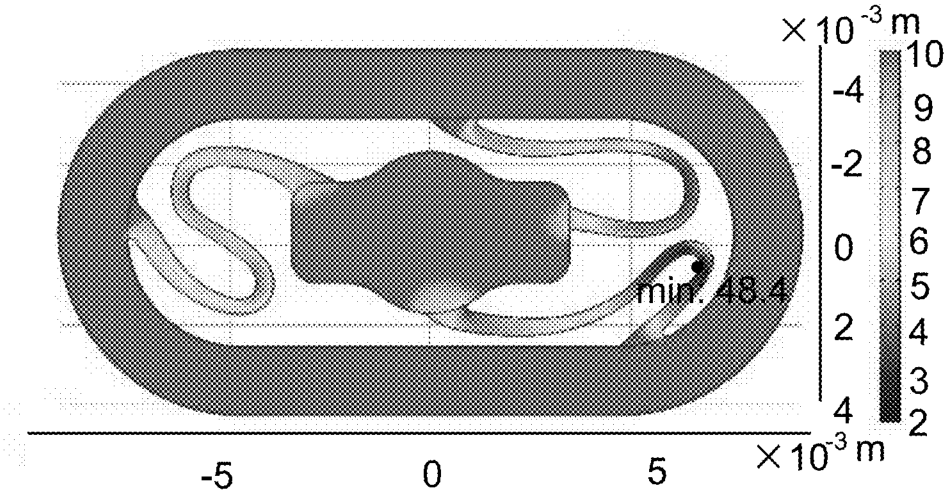
FIG. 5D is a schematic diagram illustrating a distribution of counts of fatigue failures of a vibration plate under a load along a flipping direction according to some embodiments of the present disclosure.

FIG. 4A-FIG. 4D are schematic diagrams illustrating stress distributions of a vibration plate under a load along a length direction of a hollow-out region, a load along a width direction of the hollow-out region, a load along an axial direction, and a load along a flipping direction, respectively. FIG. 5A-FIG. 5D are schematic diagrams illustrating fatigue failure count distributions of the vibration plate under a load along a length direction of a hollow-out region, a load along a width direction of the hollow-out region, a load along an axial direction, and a load along a flipping direction, respectively. As shown in FIG. 4A, when the vibration plate 100 is under the load along the length direction of the hollow-out region, stresses may be distributed concentratedly at the curved portion of the third rod 133. As shown in FIG. 5A and FIG. 5D, the curved portion of the third rod 133 may cause a minimum count of fatigue failure cycles for the vibration plate 100 when under the load along the flipping direction. Thus, it can be concluded that the load along the length direction of the hollow-out region and the load along the flipping direction may be the main reason for the main failure mode of the vibration plate 100, i.e., the main reason for the fracture of the curved portion of the third rod 133. In some embodiments, to reduce the impact of the load on the vibration plate 100 along the length direction of the hollow-out region, an elastic coefficient of each rod in the vibration plate 100 along the length direction of the hollow-out region may be reduced.

In some embodiments, according to a stress calculation formula (i.e., a stress is equal to a received load divided by a cross-sectional area of the rod), it may be known that by increasing the cross-sectional area of the rod, an impact stress received by the rod may be reduced. Thus, an impact resistance of the vibration plate may be improved, thereby improving the service life of the vibration plate. In some embodiments, the cross-sectional area of the rod may be increased by increasing a width or a thickness of the rod. For example, the thickness of the rod may be set to be the same as a thickness of the vibrating member so that the cross-sectional area of the rod may be increased by increasing the width of the rod. The cross-sectional area of the rod may be an area of a cross-section of the rod that is perpendicular to an extension direction thereof. The width of the rod, on the other hand, may be a dimension of the rod perpendicular to the extension direction thereof.

In some embodiments, since an increase in the width of the rod may lead to a change (i.e., an increase) in the elastic coefficient of the vibration plate (e.g., an elastic coefficient along the length direction of the hollow-out region and an elastic coefficient along the flipping direction), the increase in the elastic coefficient may lead to an increase in the impact of the load on the vibration plate along the length direction of the hollow-out region. Therefore, when improving the vibration plate 100, a relationship between the width of the rod and the elastic coefficient of the vibration plate may be considered to make the elastic coefficient of the vibration plate (e.g., the elastic coefficient along the length direction of the hollow-out region) decrease more than the increase in the width of the rod, so that the overall stresses may be reduced.

In some embodiments, by performing simulation experiments on the vibration plate 100, an impact of the change in the width of the rod on the elastic coefficient of the vibration plate 100 (e.g., the elastic coefficient along the length direction of the hollow-out region and the elastic coefficient along the flipping direction) may be determined, thus obtaining a better adjustment scheme for the width of the rod. Specifically, a better adjustment scheme for the width of the rod may be obtained by researching the elastic coefficient of the vibration plate along the length direction of the hollow-out region and/or the elastic coefficient along the flipping direction, an average stress at a cross-section of the vibration plate that is susceptible to fracture (e.g., a cross-section of the third rod 133 corresponding the position T in FIG. 3A, and the cross-section of the third rod corresponding to the position U in FIG. 3B), and a relationship between the count of fatigue failure cycles and the change in the width of the rod (e.g., the third rod).

Figure 6:
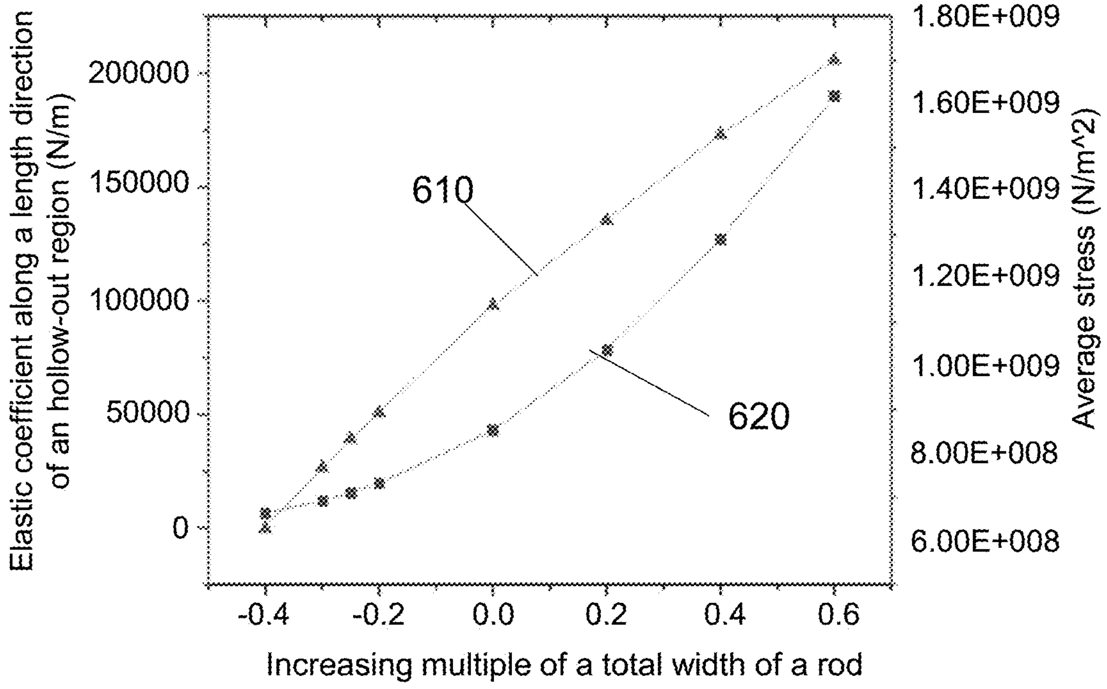
FIG. 6 is a schematic diagram illustrating relationships among a change in an elastic coefficient of a vibration plate along a length direction of a hollow-out region, an average stress of a cross-section corresponding to a location with a maximum curvature of a curved portion of a third rod, and a variation multiple of a width of a rod according to some embodiments of the present disclosure.
Figure 7:
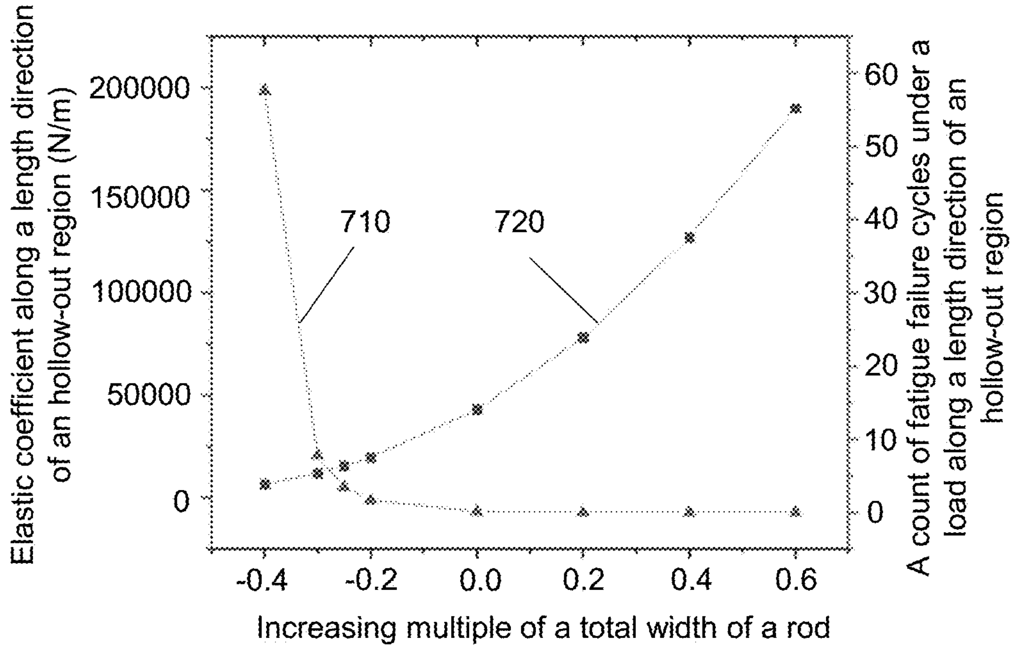
FIG. 7 is a schematic diagram illustrating relationships among a count of fatigue failure cycles of a vibration plate under a load along a length direction of a hollow-out region, a change in an elastic coefficient along a length direction of a hollow-out region, and a variation multiple of a width of a rod according to some embodiments of the present disclosure.

FIG. 6 is a schematic diagram illustrating relationships among a change in an elastic coefficient of a vibration plate along a length direction of a hollow-out region, an average stress of a cross-section corresponding to a location with a maximum curvature of a curved portion of a third rod, and a variation multiple of a width of a rod according to some embodiments of the present disclosure. FIG. 7 is a schematic diagram illustrating relationships among a count of fatigue failure cycles of a vibration plate under a load along a length direction of a hollow-out region, a change in an elastic coefficient along a length direction of a hollow-out region, and a variation multiple of a width of a rod according to some embodiments of the present disclosure. In FIG. 6, curve 610 represents a curve reflecting a relationship between the average stress of the cross-section corresponding to the location with the maximum curvature of the curved portion of the third rod and an increasing multiple of a total width of the rod. Curve 620 represents a curve reflecting a relationship between an increasing amount of the elastic coefficient of the vibration plate 100 in the length direction of the hollow-out region and the increasing multiple of the total width of the rod. In FIG. 7, curve 710 represents a curve reflecting a relationship between the count of fatigue failure cycles of the vibration plate 100 under the load along the length direction of the hollow-out region and the increasing multiple of the total width of the rod. Curve 720 represents a curve reflecting a relationship between the increasing amount of the elastic coefficient of the vibration plate 100 in the length direction of the hollow-out region and the increasing multiple of the total width of the rod.

Referring to FIG. 6 and FIG. 7, it can be seen that when the vibration plate is under a load along the length direction of the hollow-out region, with the decrease of the width of the rod, the elastic coefficient of the vibration plate along the length direction of the hollow-out region may be decreased, the average stress of the cross-section corresponding to the location with the maximum curvature of the curved portion of the third rod may be decreased, and the count of fatigue failure cycles caused by the load along the length direction of the hollow-out region may be increased. From FIG. 7, it may be seen that the count of fatigue failure cycles caused by the load along the length direction of the hollow-out region may be increased significantly after the width of the rod is reduced by 20%, which indicates that the fatigue life of the vibration plate may be significantly improved.

Figure 8:
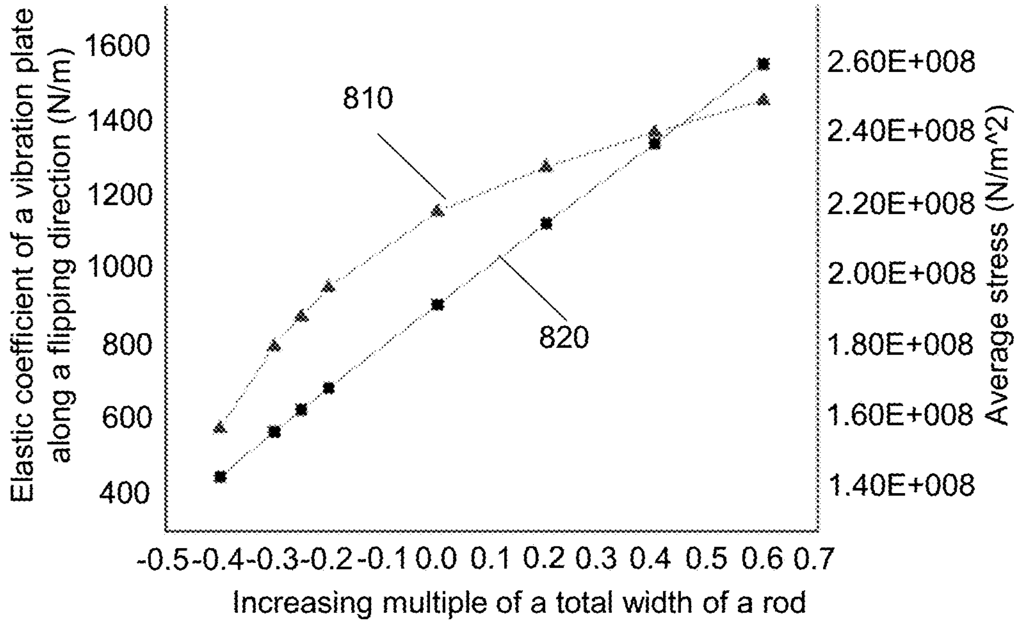
FIG. 8 is a schematic diagram illustrating relationships among a change in an elastic coefficient of a vibration plate along a flipping direction, an average stress of a cross-section corresponding to a connection region connecting a third rod and a ring structure, and a variation multiple of a width of a rod according to some embodiments of the present disclosure.
Figure 9:
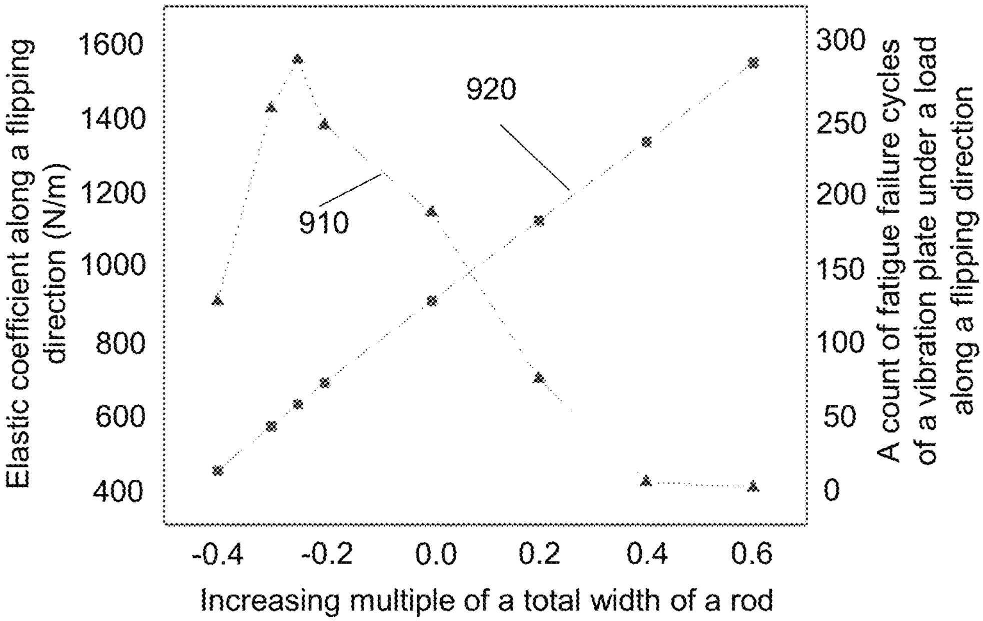
FIG. 9 is a schematic diagram illustrating relationships among a count of fatigue failure cycles of a vibration plate under a load along a flipping direction, an elastic coefficient along the flipping direction, and a variation multiple of a width of a rod according to some embodiments of the present disclosure.

FIG. 8 is a schematic diagram illustrating relationships among a change in an elastic coefficient of a vibration plate along a flipping direction, an average stress of a cross-section corresponding to a connection region connecting a third rod and a ring structure, and a variation multiple of a width of a rod according to some embodiments of the present disclosure. FIG. 9 is a schematic diagram illustrating relationships among a count of fatigue failure cycles of a vibration plate under a load along a flipping direction, an elastic coefficient along the flipping direction, and a variation multiple of a width of a rod according to some embodiments of the present disclosure. In FIG. 8, curve 810 is a curve reflecting a relationship between the average stress of the cross-section corresponding to the connection region connecting the third rod and the ring structure and an increasing multiple of a total width of a rod. Curve 820 is a curve reflecting a relationship between an increasing amount of the elastic coefficient of the vibration plate along the flipping direction and the increasing multiple of the total width of the rod. In FIG. 9, curve 910 is a curve reflecting a relationship between the count of fatigue failure cycles of the vibration plate 100 under the load along the flipping direction and the increasing multiple of the total width of the rod. Curve 920 is a curve reflecting a relationship between the increasing amount of the elastic coefficient of the vibration plate 100 along the flipping direction and the increasing multiple of the total width of the rod.

Referring to FIG. 8 and FIG. 9, it may be seen that when the vibration plate is under the load along the flipping direction, with the decrease of the width of the rod, the elastic coefficient of the vibration plate along the flipping direction may be decreased, the average stress of the cross-section corresponding to the connection region connecting the third rod 133 and the ring structure 110 may be decreased, and the count of fatigue failure cycles caused by the load along the flipping direction may be increased and then decreased. In some embodiments, the count of fatigue failure cycles caused by the load along the flipping direction may have a maximum value when the width of the rod is decreased by 20%, which may better improve the fatigue life of the vibration plate.

In some embodiments, referring to FIG. 6, FIG. 7, FIG. 8, and FIG. 9, it may be seen that when improving the vibration plate 100, the fatigue life of the vibration plate may be improved by appropriately decreasing the width of the rod (e.g., decreasing the width of the rod by 20%). In some embodiments, the width of the rod may be within a range of 0.2 mm-1 mm. Preferably, the width of the rod may be within a range of 0.25 mm-0.5 mm. Preferably, the width of the rod may be within a range of 0.3 mm-0.4 mm. A thickness of the rod may be generally a constant value to facilitate the machining of the rod. In some embodiments, a ratio of the width of the rod to the thickness of the rod may be not less than 1.

In some embodiments, the elastic coefficient of the rod along the length direction of the hollow-out region may be reduced by adjusting a count of the rods, a count and/or curvature of the curved portion of the rod, and a length and/or the width of the rod, etc., which reduces an impact of the load on the vibration plate along the length direction of the hollow-out region, thereby improving the fatigue resistance of the vibration plate.

In some embodiments, in the vibration plate 100, to ensure that one or more rods can have sufficient lengths to form the curved portion to reduce the elastic coefficient in the length direction of the hollow-out region 140, the length of each of the rods may be all greater than 50% of a maximum dimension D1 of the hollow-out region along the length direction. In some embodiments, to ensure that the rods can have sufficient lengths to form a plurality of curved portions to increase a count of meanderings of the rods, and to further reduce the elastic coefficient of the vibration plate in the length direction of the hollow-out region 140, the length of each of the rods may be greater than 65% of the maximum dimension of the hollow-out region 140 along the length direction. In some embodiments, to ensure a sound quality of a bone conduction earphone and to better reduce the elastic coefficient of the vibration plate 100 along the length direction of the hollow-out region 140, the length of each of the rods may be greater than 75% of the maximum dimension of the hollow-out region 140 along the length direction.

To ensure that the hollow-out region 140 has sufficient space to accommodate the vibrating member 120 and the rods (i.e., the first rod 131, the second rod 132, and the third rod 133), and to ensure that the vibration plate can fit into a narrow space of the bone conduction earphone, in some embodiments, the hollow-out region 140 may have a maximum dimension D1 of 8-20 mm along the length direction and a maximum dimension D2 of 3-8 mm along the width direction. In some embodiments, the hollow-out region 140 may have the maximum dimension D1 of 8-15 mm along the length direction and the maximum dimension D2 of 3-6 mm along the width direction. In some embodiments, the hollow-out region 140 may have the maximum dimension D1 of 8-12 mm along the length direction and the maximum dimension D2 of 3-6 mm along the width direction.

A ratio of the maximum dimension D1 of the hollow-out region 140 along the length direction to the maximum dimension D2 of the hollow-out region 140 along the width direction may be within a certain range to ensure that the vibration plate 100 has a better overall structural strength and the hollow-out region 140 provides a sufficient space for the meanderings of the rods (i.e., the first rod 131, the second rod 132, and the third rod 133), and to ensure that the curved portion of each of the rods maintain a certain distance from the ring structure to prevent the curved portion of each of the rods from colliding with the ring structure when the curved portion shakes along the width direction of the hollow-out region when the vibration plate is in operation, thus reducing the fatigue resistance of the rods. In some embodiments, the ratio of the maximum dimension D1 of the hollow-out region 140 along the length direction to the maximum dimension D2 of the hollow-out region 140 along the width direction may be within a range of 1.5-3. In some embodiments, the ratio of the maximum dimension D1 of the hollow-out region 140 along the length direction to the maximum dimension D2 of the hollow-out region 140 along the width direction may be within a range of 1.5-2.5. In some embodiments, the ratio of the maximum dimension D1 of the hollow-out region 140 along the length direction to the maximum dimension D2 of the hollow-out region 140 along the width direction may be within a range of 1.5-2.

Figure 10:
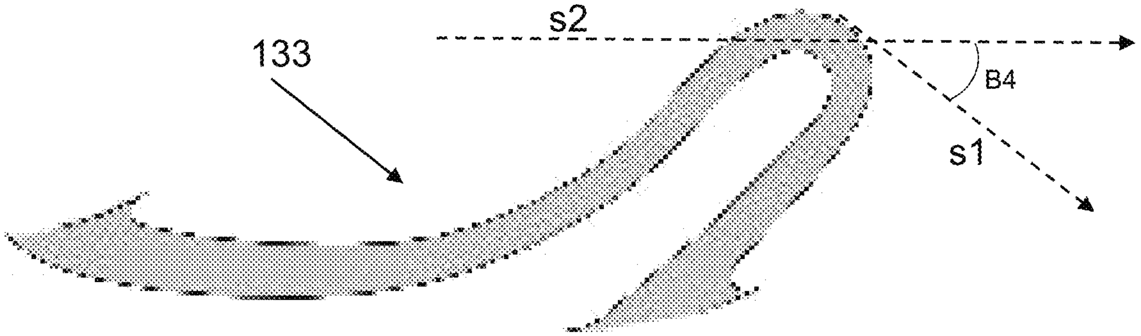
FIG. 10 is a schematic diagram illustrating a structure of a third rod according to some embodiments of the present disclosure.

In some embodiments, the rod of the vibration plate 100 may have a fiber structure. The fiber structure may have a plurality of layers of fibers. When a direction of a force to which a rod is subjected is parallel to an extension direction of the fibers, or an included angle between the direction of the force to which the rod is subjected and the extension direction of the fibers is relatively small, the fiber body of the fiber structure may be subjected to the force, at this time, the load-bearing capacity of the rod may be relatively high, and the rod is not prone to fracture. When the included angle between the direction of the force to which the rod is subjected and the extension direction of the fibers is relatively large, a bonding interface between the plurality of layers of fibers may be subjected to the force, at this time, the load-bearing capacity of the rod is greatly reduced, which may lead to separation of the fibers, causing the fracture of the rod. Accordingly, in some embodiments, the structure of the vibration plate may be set up such that an included angle between a tangent direction at a location of a region with maximum curvature on at least one rod and the extension direction of the fiber structure may be within a range of 0°-30°. By such an arrangement, the force (e.g., the impact of the load on the vibration plate along the length direction of the hollow-out region) applied to the rod when the vibration plate is in operation may be the force to be applied to the fibers in the fiber structure of the rod, so as to improve the load-bearing capacity of the rod, and reduce the risk of the fracture of the rod. FIG. 10 is a schematic diagram illustrating a structure of a third rod according to some embodiments of the present disclosure. Taking the third rod 133 as an example, as shown in FIG. 10, a tangent direction of a location of a region with maximum curvature of the third rod 133 (i.e., a location where the fracture occurs at the curved portion of the third rod 133) is s1, the extension direction is s2, and an included angle $\alpha 4$ between s1 and s2 is within a range of 0°-30°. In such a case, the load-bearing capacity of the curved portion of the third rod 133 may be greatly improved, and the risk of fracture of the curved portion of the third rod 133 may be reduced.

To improve the structural stability of the vibration plate and to avoid shaking of the vibrating member when the vibration plate is in operation, in some embodiments, each of the rods in the vibration plate (e.g., the vibration plate 100) may be of a different length. Compared with a symmetric structure (e.g., a four-rod symmetric structure), such an asymmetric three-rod structure may better reduce or avoid the risk of shaking of the vibrating member during operation, which may reduce or avoid the possibility of a magnetic circuit system connected with the vibrating member colliding with a housing or a voice coil of the bone conduction earphone to produce a strange sound, ensuring that the bone conduction earphone has a better sound quality. In addition, by setting the length of each of the rods in the vibration plate to be different, the displacement amounts (or be referred to as the elastic deformations) of the vibrating member and the rod in the length direction of the hollow-out region may be reduced, thus the impact of the load on the vibration plate along the length direction of the hollow-out region may be reduced, and the risk of fracture of the vibration plate (e.g., each of the rods) may be reduced.

Figure 11:
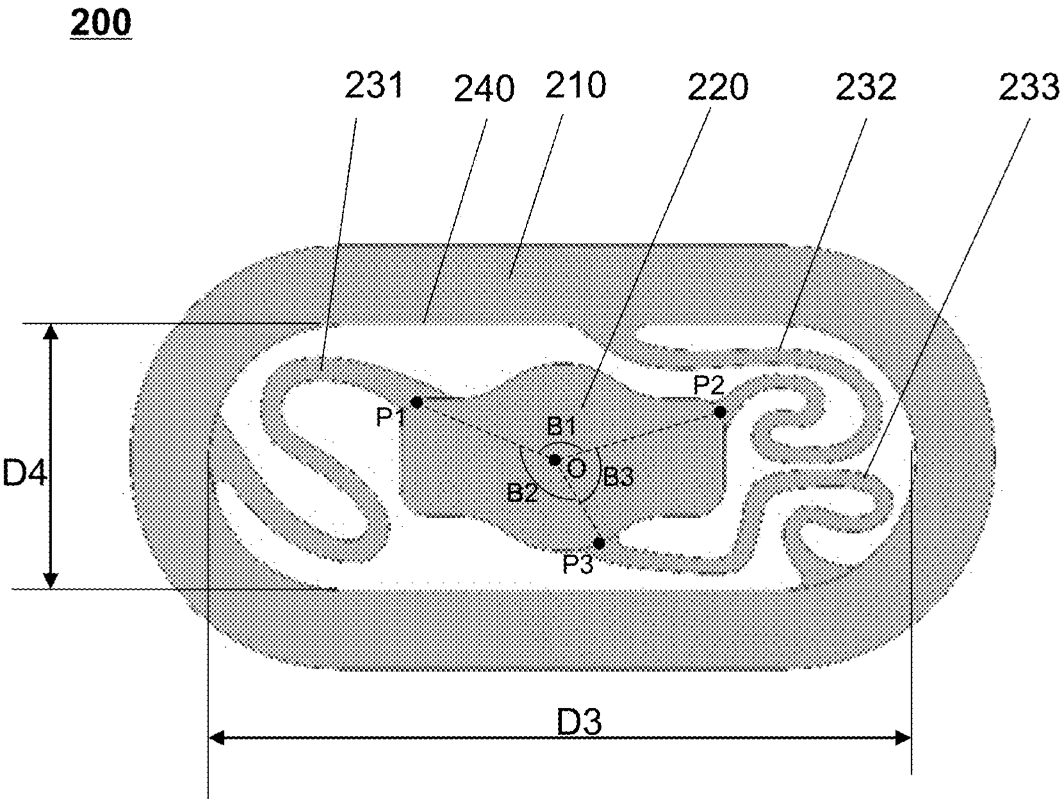
FIG. 11 is a schematic diagram illustrating a structure of a vibration plate according to some embodiments of the present disclosure.
Figure 14:
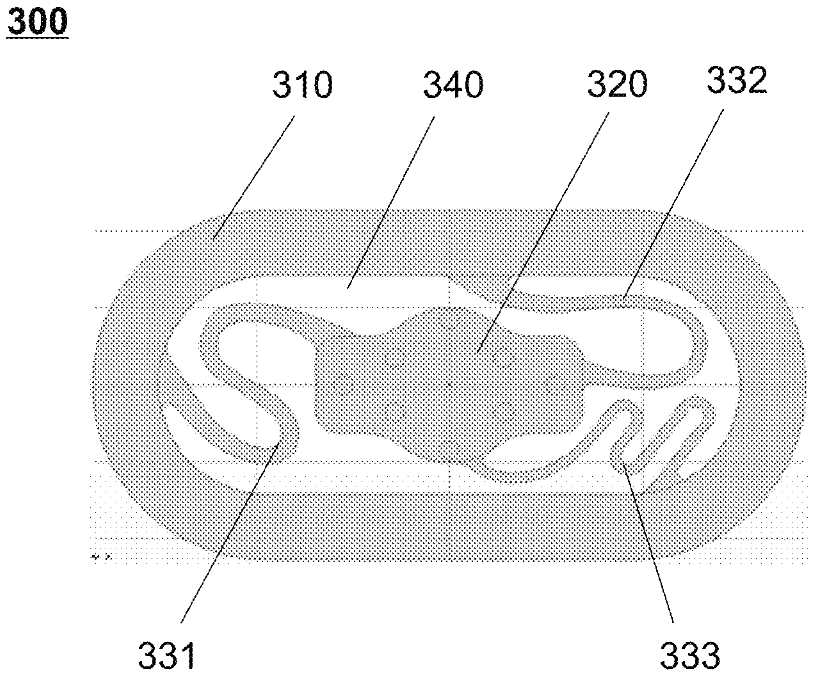
FIG. 14 is a schematic diagram illustrating a structure of a vibration plate according to some embodiments of the present disclosure.
Figure 15:
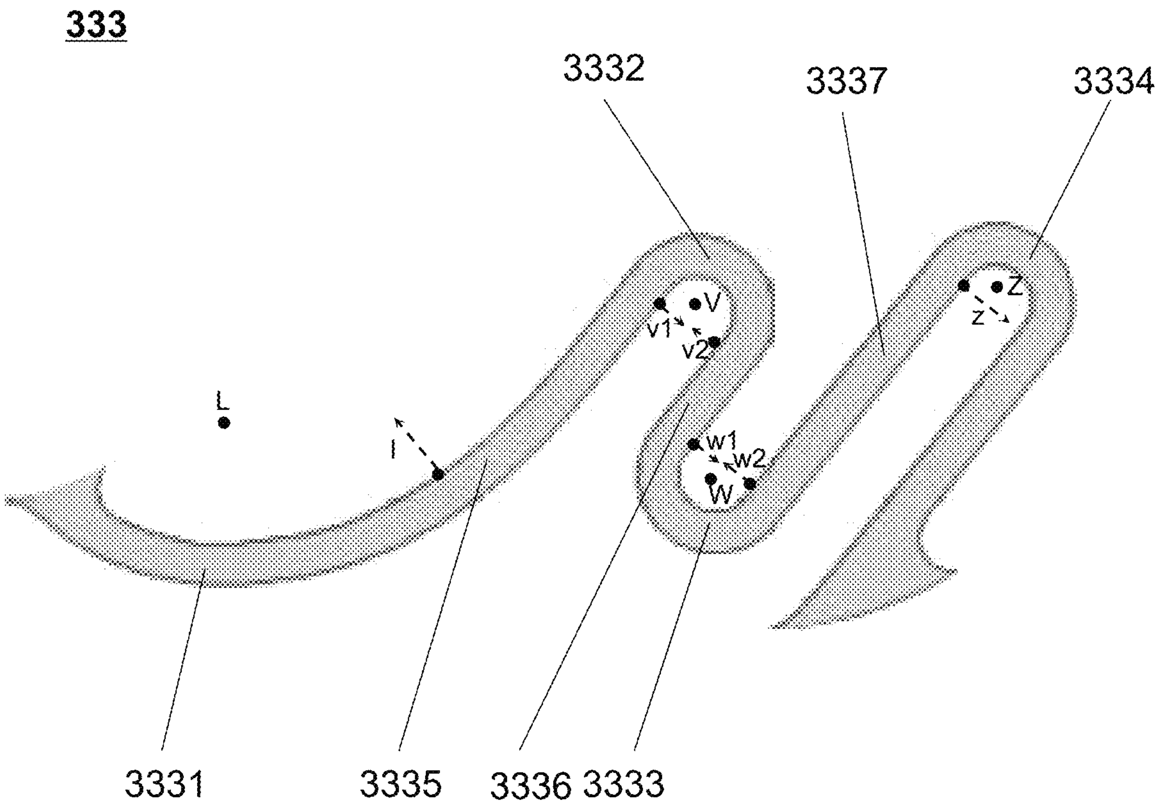
FIG. 15 is a schematic diagram illustrating a structure of a third rod according to some embodiments of the present disclosure.

In some embodiments, parameters related to the vibration plate 100 (the width of the rod, the length of the rod, the curvature of the curved portion, the ratio of the length of the rod to the maximum dimension of the hollow-out region along the length direction, and the ratio of the maximum dimension of the hollow-out region along the length direction to the maximum dimension of the hollow-out region along the width direction, etc.) in the above embodiments may be applicable to the vibration plate in other embodiments of the present disclosure (e.g., a vibration plate 200 shown in FIG. 11, a vibration plate 300 shown in FIG. 14, or a vibration plate 400 shown in FIG. 15).

In some embodiments, the count of curved portions of the rod may be increased to make the rod meander a plurality of times in a limited space formed between the ring structure and the vibrating member, to further reduce the elastic coefficient of the vibration plate in the length direction provided by the vibrating member.

FIG. 11 is a schematic diagram illustrating a structure of a vibration plate according to some embodiments of the present disclosure. As shown in FIG. 11, the vibration plate 200 includes a ring structure 210, a vibrating member 220, and a plurality of rods. A central region of the ring structure 210 has a hollow-out region 240. In some embodiments, the plurality of rods may include a first rod 231, a second rod 232, and a third rod 233. The first rod 231, the second rod 232, and the third rod 233 may be arranged at intervals along a circumferential direction of the vibrating member. In some embodiments, a count of curved portions of the plurality of rods (e.g., the first rod 231, the second rod 232, and the third rod 233) may also vary. For example, a count of curved portions in the first rod 231 may be two, a count of curved portions in the second rod 232 may be four, and a count of curved portions in the third rod 233 may be four. In some embodiments, the count of curved portions of the plurality of rods (e.g., the first rod 231, the second rod 232, and the third rod 233) may be the same. For example, the count of curved portions in the first rod 231, the count of curved portions in the second rod 232, and the count of curved portions in the third rod 233 may all be two, three, four, etc. Merely by way of example, by providing a plurality of curved portions on each of the plurality of rods, a length of each of the plurality of rods may be increased to effectively reduce an elastic coefficient of each of the plurality of rods in a length direction of a hollow-out region, to reduce an impact of a load on the vibration plate 200 along the length direction of the hollow-out region. A specific structure of each of the plurality of rods may be described in detail below in conjunction with the accompanying drawings. The ring structure 210, the vibrating member 220, the hollow-out region 240, and the first rod 231 in the vibration plate 200 are similar to the ring structure 110, the vibrating member 220, the hollow-out region 140, and the first rod 131 in the vibration plate 100. More descriptions regarding dimensions, shapes, etc., of the ring structure 210, the vibrating member 220, the hollow-out region 240, and the first rod 231 may be found in related descriptions of the vibration plate 100.

Figure 12:
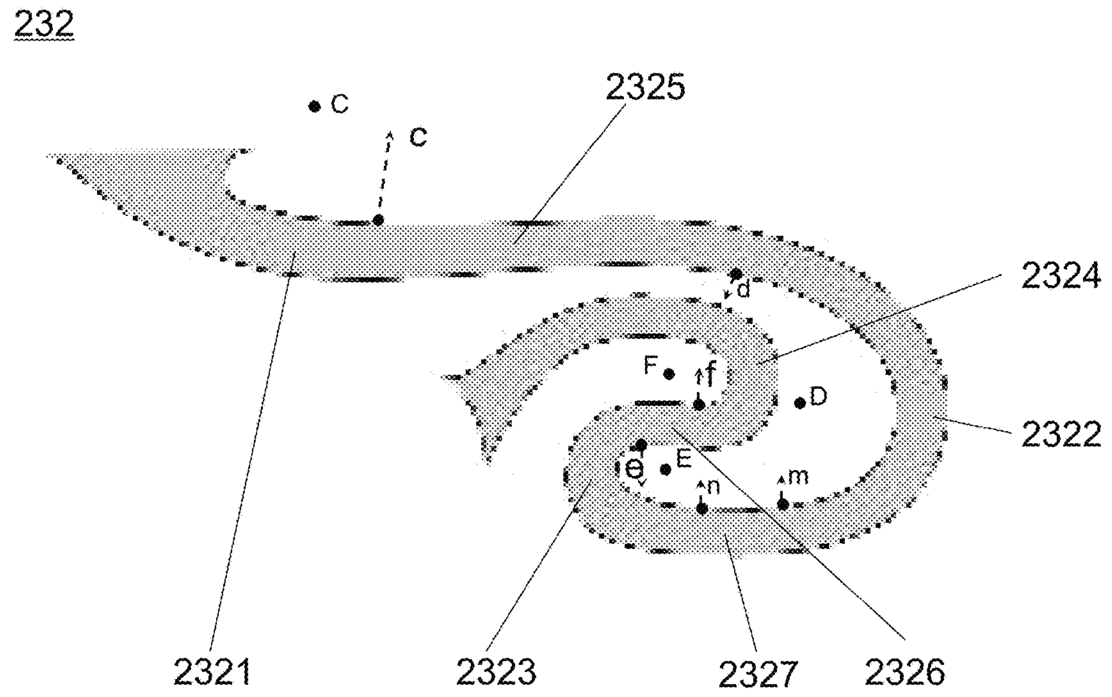
FIG. 12 is a schematic diagram illustrating a structure of a second rod according to some embodiments of the present disclosure.

FIG. 12 is a schematic diagram illustrating a structure of a second rod according to some embodiments of the present disclosure. Referring to FIG. 11 and FIG. 12, one end of the second rod 232 is connected to an inner side of the ring structure 210, and another end of the second rod 232 is connected to the vibrating member 220. In some embodiments, the second rod 232 may include a curved portion 2321, a curved portion 2322, a curved portion 2323, and a curved portion 2324 arranged sequentially along the main body of the second rod 232. In some embodiments, curvature centers corresponding to different curved portions may be located on two sides of the second rod 232. The two sides of the second rod 232 refer to two sides along an extension direction of the second rod 232 from the ring structure 210 to the vibrating member 220. For example, a curvature center C of the curved portion 2321 and a curvature center D of the curved portion 2322 in FIG. 12 are located on two sides of the second rod 232. As another example, a curvature center D of the curved portion 2322 and a curvature center F of the curved portion 2324 are located on two sides of the second rod 232. As another example, the curvature center E of the curved portion 2323 and the curvature center F of the curved portion 2324 are located on two sides of the second rod 232 (a transition portion 2326), respectively. In some embodiments, the curvature centers of some of the curved portions of the second rod 232 may also be located on the same side of the second rod 232. For example, the curvature center D of the curved portion 2322 and the curvature center E of the curved portion 2323 are located on the same side of the second rod 232.

In some embodiments, the second rod 232 may further include a transition portion 2325 and a transition portion 2326. Two ends of the transition portion 2325 may be connected to the curved portion 2321 and the curved portion 2322, respectively, and two ends of the transition portion 2326 may be connected to the curved portion 2323 and the curved portion 2324, respectively. An inner normal direction corresponding to a connecting portion connecting the curved portion 2321 to the transition portion 2325 is shown by an arrow c, and an inner normal direction corresponding to a connecting portion connecting the curved portion 2322 to the transition portion 2325 is shown by an arrow d. An inner normal direction corresponding to a connecting portion connecting one end of the transition portion 2126 to the curved portion 2323 is shown as an arrow e, and an inner normal direction corresponding to a connecting portion connecting another end of the transition portion 2326 to the curved portion 2324 is shown as an arrow f. The inner normal direction c and the inner normal direction d point to two sides of the second rod 232, respectively. The inner normal direction e and the inner normal direction f point to two sides of the second rod 232, respectively. In some embodiments, the second rod 232 may further include a transition portion 2327. Two ends of the transition portion 2327 may be connected with the curved portion 2322 and the curved portion 2323, respectively. An inner normal direction corresponding to a connecting portion connecting the curved portion 2322 to the transition portion 2327 is shown by an arrow m, and an inner normal direction corresponding to a connecting portion connecting the curved portion 2323 and the transition portion 2327 is shown by an arrow n. In some embodiments, the inner normal direction m and the inner normal direction n may point to the same side of the second rod 232.

Figure 13:
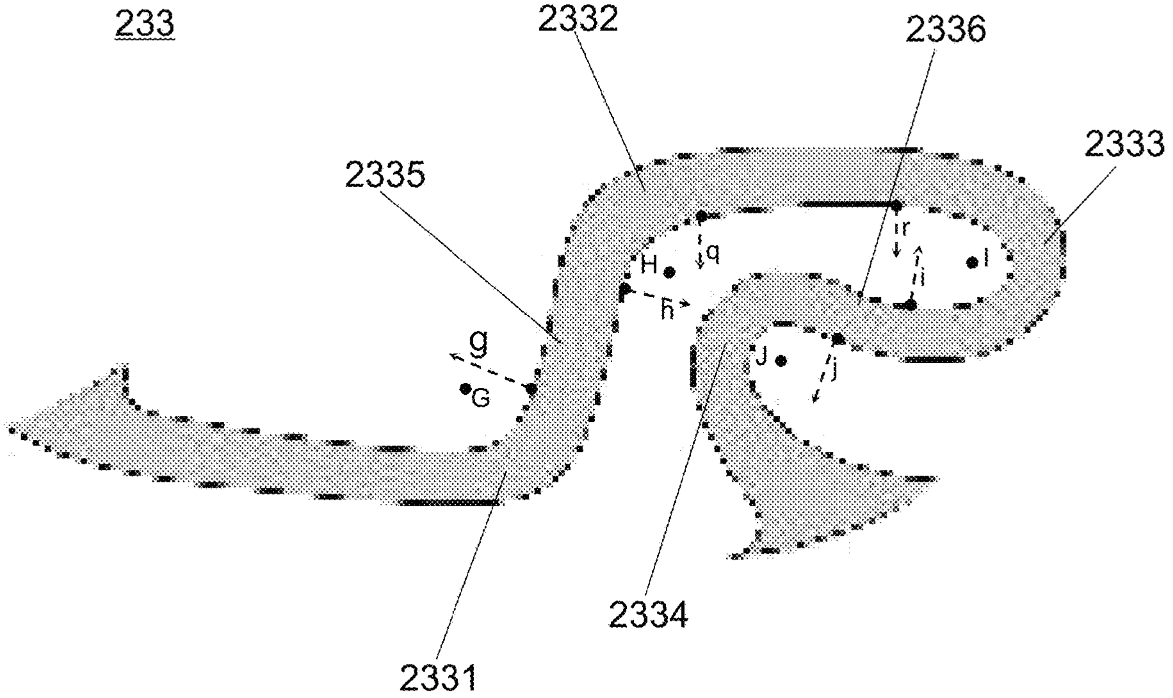
FIG. 13 is a schematic diagram illustrating a structure of a third rod according to some embodiments of the present disclosure.

FIG. 13 is a schematic diagram illustrating a structure of a third rod according to some embodiments of the present disclosure. Referring to FIG. 11 and FIG. 13, one end of the third rod 233 is connected to the ring structure 210, and another end of the third rod 233 is connected to the vibrating member 220. In some embodiments, the third rod 233 may include a curved portion 2331, a curved portion 2332, a curved portion 2333, and a curved portion 2334 arranged sequentially along the main body of the third rod 233. A curvature center G of the curved portion 2331 and a curvature center H of the curved portion 2332 may be located on two sides of the third rod 233 (a transition portion 2335), respectively. A curvature center H of the curved portion 2332 and a curvature center J of the curved portion 2334 are located on the two sides of the third rod 233 (a curved portion 2334), respectively. A curvature center I of the curved portion 2333 and a curvature center J of the curved portion 2334 are located on the two sides of the third rod 233 (a transition portion 2336), respectively. In some embodiments, the curvature center H of the curved portion 2332 and the curvature center I of the curved portion 2333 may be located on the same side of the third rod 233.

In some embodiments, the third rod 233 may further include a transition portion 2335 and a transition portion 2336. Two ends of the transition portion 2335 of the third rod may be connected with the curved portion 2331 and the curved portion 2332, respectively, and two ends of the transition portion 2336 may be connected with the curved portion 2333 and the curved portion 2334, respectively. An inner normal direction corresponding to a connecting portion connecting the curved portion 2331 to the transition portion 2335 is shown by an arrow g, an inner normal direction corresponding to a connecting portion connecting the curved portion 2332 to the transition portion 2335 is shown by an arrow h, an inner normal direction corresponding to a connecting portion connecting the curved portion 2333 to the transition portion 2336 is shown by an arrow i, and an inner normal direction corresponding to a connecting portion connecting the curved portion 2334 to the transition portion 2336 is shown by an arrow j. The inner normal direction g and the inner normal direction h may point to the two sides of the third rod 233, respectively. The inner normal direction i and the inner normal direction j may point to the two sides of the third rod 233, respectively. In some embodiments, the third rod 233 may further include a transition portion 2337, and two ends of the transition portion 2337 may be connected with the curved portion 2332 and the curved portion 2333, respectively. An inner normal direction corresponding to a connecting portion connecting the curved portion 2332 to the transition portion 2337 is shown by an arrow q, and an inner normal direction corresponding to a connecting portion connecting the curved portion 2333 to the transition portion 2337 is shown by an arrow r. In some embodiments, the inner normal direction q and the inner normal direction r may both point to the same side of the second rod 233.

In some embodiments, a length of the rod may be increased by providing one or more curved portions with curvatures satisfying a certain condition, thereby effectively reducing a lower elastic coefficient of the rod in a length direction of the hollow-out region. The first rod 231, the second rod 232, and the third rod 233 may include at least one curved portion with a curvature of 2-10. For example, the first rod 131, the second rod 132, and the third rod 133 may include at least one curved portion with a curvature of 4-10. As another example, the first rod 131, the second rod 132, and the third rod 133 may include at least one curved portion with a curvature of 6-10. The greater the curvature of the curved portion, the greater the degree of curvature. In such cases, a count of curved portions of the rod may be increased in a limited space, thus the elastic coefficient of the rod in the length direction of the hollow-out region may be better reduced. For example, the curvature of at least one of the curved portion 2321, the curved portion 2322, the curved portion 2323, and the curved portion 2324 of the second rod 232 may be 2-10. As another example, the curvature of at least one of the curved portion 2331, the curved portion 2332, the curved portion 2333, and the curved portion 2334 of the third rod 233 may be 2-10.

To ensure that the first rod 231, the second rod 232, and the third rod 233 can have sufficient lengths to form corresponding curved portions to reduce the elastic coefficient of the vibration plate 200 in the length direction of the hollow-out region, and at the same time to ensure that the rods can be arranged in the hollow-out region 240 with limited space, in some embodiments, a ratio of the length of the first rod 231 to a maximum dimension of the hollow-out region along the length direction (as shown in FIG. 11 as D3) of the hollow-out region may be within a range of 75%-85%, a ratio of the length of the second rod 232 to the maximum dimension of the hollow-out region 240 along the length direction of the hollow-out region may be within a range of 85%-96%, and a ratio of the length of the third rod 233 to the maximum dimension of the hollow-out region 240 along the length direction of the hollow-out region may be within a range of 70%-80%. In some embodiments, the ratio of the length of the first rod 231 to the maximum dimension of the hollow-out region along the length direction of the hollow-out region may be within a range of 75%-83%, the ratio of the length of the second rod 232 to the maximum dimension of the hollow-out region 240 along the length direction of the hollow-out region may be within a range of 85%-94%, and the ratio of the length of the third rod 233 to the maximum dimension of the hollow-out region 240 along the length direction of the hollow-out region may be within a range of 70%-87%. In some embodiments, the ratio of the length of the first rod 231 to the maximum dimension of the hollow-out region along the length direction of the hollow-out region may be within a range of 75%-80%, the ratio of the length of the second rod 232 to the maximum dimension of the hollow-out region 240 along the length direction of the hollow-out region may be within a range of 85%-90%, and the ratio of the length of the third rod 233 to the maximum dimension of the hollow-out region 240 along the length direction of the hollow-out region may be within a range of 70%-82%. Merely by way of example, in some embodiments, the maximum dimension D3 of the hollow-out region 240 of the vibration plate 200 along the length direction of the hollow-out region may be 15.05 mm, and the maximum dimension D4 of the hollow-out region 240 of the vibration plate 200 along the width direction of the hollow-out region may be 5.65 mm. The length of the first rod 231 may be 12.37 mm, the length of the second rod 232 may be 14.08 mm, and the length of the third rod 233 may be 11.75 mm. It should be noted that the lengths of the first rod 231, the second rod 232, and the third rod 233 refer to straight lengths after stretching and unfolding.

In some embodiments, continuing to refer to FIG. 11, a contact point P1 between the first rod 231 and the vibrating member 220 may be connected with a center point O of the vibrating member by a first connecting line, a contact point P2 between the second rod 232 and the vibrating member 220 may be connected with the center point O of the vibrating member by a second connecting line, and a contact point P3 between the third rod 233 and the vibrating member 220 may be connected with the center point O of the vibrating member by a third connecting line. An included angle B1 between the first connecting line and the second connecting line or an included angle B2 between the first connecting line and the third connecting line may be greater than an included angle B3 between the second connecting line and the third connecting line. In some embodiments, when the shape of the vibrating member 220 is regular geometric, the center point O of the vibrating member 220 may be a geometric center of the vibrating member 220. For example, when the vibrating member 220 is a circle, the center point O may be a center of the circle. As another example, when the vibrating member 220 is a rectangle, the center point O may be an intersection of two diagonal lines of the rectangle. In some embodiments, when the shape of the vibrating member 220 is irregular, a centroid of the vibrating member 220 may be regarded as the center point O of the vibrating member 220.

In some embodiments, the included angle B1 between the first connecting line and the second connecting line may be within a range of 100°-140°, the included angle B2 between the first connecting line and the third connecting line may be within a range of 120°-160°, and the included angle B3 between the second connecting line and the third connecting line may be within a range of 70°-100°. In some embodiments, the included angle B1 between the first connecting line and the second connecting line may be within a range of 105°-130°, the included angle B2 between the first connecting line and the third connecting line may be within a range of 120°-150°, and the included angle B3 between the second connecting line and the third connecting line may be within a range of 70°-90°. In some embodiments, the included angle B1 between the first connecting line and the second connecting line may be within a range of 100°-140°, the included angle B2 between the first connecting line and the third connecting line may be within a range of 120°-160°, and the included angle B3 between the second connecting line and the third connecting line may be within a range of 75°-90°. In some embodiments, the included angle B1 between the first connecting line and the second connecting line may be within a range of 110°-125°, the included angle B2 between the first connecting line and the third connecting line may be within a range of 120°-145°, and the included angle B3 between the second connecting line and the third connecting line may be within a range of 75°-85°. In some embodiments, the included angle B1 between the first connecting line and the second connecting line may be within a range of 115°-120°, the included angle B2 between the first connecting line and the third connecting line may be within a range of 125°-140°, and the included angle B3 between the second connecting line and the third connecting line may be within a range of 75°-80°.

Merely by way of example, in some embodiments, the included angle B1 between the first connecting line and the second connecting line may be 128°, the included angle B2 between the first connecting line and the third connecting line may be 145°, and the included angle B3 between the second connecting line and the third connecting line may be 87°. Merely by way of example, the hollow-out region of the ring structure 210 may have a racetrack-shaped structure, the vibrating member 220 may have a rectangular-like structure, and top and bottom sides of the vibrating member 220 illustrated in FIG. 11 may have portions projecting outwardly. To ensure that each of the rods has a relatively large length, the included angles (e.g., the included angles B1, B2, and B3) formed between two adjacent rods may be different, which ensures that the rods may be located in a relatively large space between the ring structure 210 and the vibrating member 220 (e.g., the hollow-out regions on a left side and a right side of the vibrating member 220 illustrated in FIG. 11). Then, the rods may be ensured to have a plurality of curved portions to further increase the length of the rod and reduce the elastic coefficient of the rod along the length direction of the hollow-out region. Therefore, an impact of a load on the vibration plate 200 along the length direction of the hollow-out region may be reduced, and the service life of the vibration plate may be improved.

In some embodiments, a cross-sectional area of each of the rods (i.e., the first rod 231, the second rod 232, and the third rod 233) in the vibration plate 200 may be increased by increasing the width of each of the rods, thus reducing an internal stress of the rods and improving the impact resistance of the vibration plate 200.

To ensure that each of the rods has a large cross-sectional area for effectively resisting the impact of the load, reducing the impact of the internal stress, and improving the impact resistance of the vibration plate, in some embodiments, the width of each of the rods in the vibration plate 200 may be greater than 0.25 mm. In some embodiments, the width of each of the rods in the vibration plate 200 may be greater than 0.28 mm. In some embodiments, the width of each of the rods in the vibration plate 200 may be greater than 0.3 mm.

FIG. 14 is a schematic diagram illustrating a structure of a vibration plate according to some embodiments of the present disclosure.

In some embodiments, the vibration plate provided by embodiments of the present disclosure may also be a vibration plate 300 as shown in FIG. 14. An overall structure of the vibration plate 300 shown in FIG. 14 is substantially the same as that of the vibration plate 100 shown in FIG. 1, and a difference between the two is that a structure of the third rod 333 shown in FIG. 14 is different from that of the third rod 133 shown in FIG. 1. More descriptions regarding the ring structure 310, the vibrating member 320, the hollow-out region 340, the first rod 331, and the second rod 332 shown in FIG. 14 may be found in related descriptions of the ring structure 110, the vibrating member 120, the hollow-out region 340, the first rod 332, and the second rod 132 in FIG. 1, and may not be repeated herein. The structure of the third rod 333 shown in FIG. 15 may be described in detail below combined with the accompanying drawings.

FIG. 15 is a schematic diagram illustrating a structure of a third rod according to some embodiments of the present disclosure.

As shown in FIG. 15, the third rod 333 includes a curved portion 3331, a curved portion 3332, a curved portion 3333, and a curved portion 3334 arranged sequentially along the main body of the third rod 333. In some embodiments, curvature centers corresponding to two adjacent curved portions in the third rod 333 may be located on two sides of the third rod 333. A curvature center L of the curved portion 3331 and a curvature center V of the curved portion 3332 may be located on the two sides of the third rod 333, respectively. A curvature center V of the curved portion 3332 and a curvature center W of the curved portion 3333 may be located on the two sides of the third rod 333, respectively. A curvature center W of the curved portion 3333 and a curvature center Z of the curved portion 3334 may be located on the two sides of the third rod 333, respectively.

In some embodiments, the third rod 333 may further include a transition section 3335, a transition section 3336, and a transition section 3337. Two ends of the transition portion 3335 may be connected with the curved portion 3331 and the curved portion 3332, two ends of the transition portion 2336 may be connected with the curved portion 3332 and the curved portion 3333, and two ends of the transition portion 3337 may be connected with the curved portion 3333 and the curved portion 3334, respectively. An inner normal direction corresponding to a connecting portion connecting the curved portion 3331 to the transition portion 3335 is shown by an arrow I, an inner normal direction corresponding to a connecting portion connecting the curved portion 3332 to the transition portion 3335 is shown by an arrow v1, an inner normal direction corresponding to a connecting portion connecting the curved portion 3332 to the transition portion 3336 is shown by an arrow v2, an inner normal direction corresponding to a connecting portion connecting the curved portion 3333 to the transition portion 3336 is shown by an arrow w1, an inner normal direction corresponding to the connecting portion connecting the curved portion 3333 to the transition portion 3337 is shown by an arrow w2, and an inner normal direction corresponding to the connecting portion connecting the curved portion 3334 to the transition portion 3337 is shown by an arrow z. The inner normal direction I and the inner normal direction v1 may point to the two sides of the third rod 333, respectively. The inner normal direction v2 and the inner normal direction w1 may point to the two sides of the third rod 333, respectively. The inner normal direction w2 and the inner normal direction z may point to the two sides of the third rod 333, respectively.

In some embodiments, the vibration plate 300 may have a large count of fatigue failure cycles under a load along a length direction of the hollow-out region and a load along a flipping direction, and may have a high fatigue life.

Figure 16:
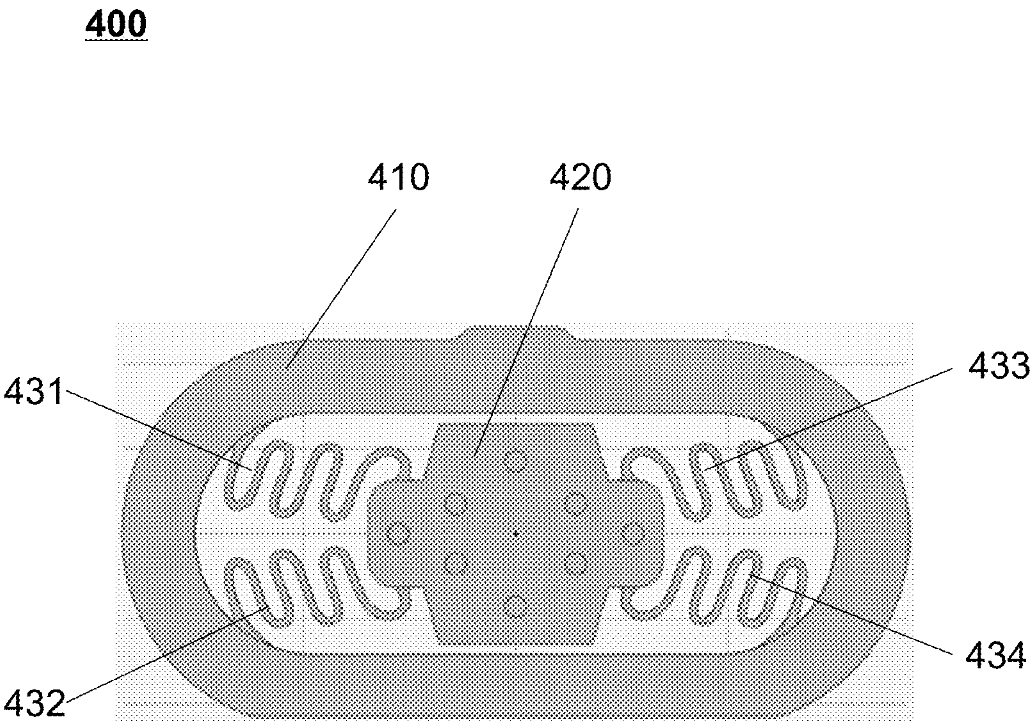
FIG. 16 is a schematic diagram illustrating a structure of a vibration plate according to some embodiments of the present disclosure.

FIG. 16 is a schematic diagram illustrating a structure of a vibration plate according to some embodiments of the present disclosure.

As shown in FIG. 16, the vibration plate 400 may include a ring structure 410, a vibrating member 420, a first rod 431, a second rod 432, a third rod 433, and a fourth rod 434. The first rod 431, the second rod 432, the third rod 433, and the fourth rod 434 may have the same structure. Specifically, the first rod 431, the second rod 432, the third rod 433, and the fourth rod 434 may have the same length, width, the same count of curved portions, and the same curvature of a curved portion. Taking the first rod 431 as an example, the first rod 431 has a plurality of curved portions, wherein curvature centers of two adjacent curved portions are located on two sides of the first rod 431. By providing the plurality of curved portions on the rod, the length of the rod may be increased, thereby decreasing an elastic coefficient of the rod. Thus, an impact of a load on the vibration plate 400 along a length direction of a hollow-out region may be reduced, and a service life of the vibration plate 400 may be improved. The count of curved portions of the first rod 431 may be two, three, four, or more, and the curvature of each of the curved portions may be the same or different. In some embodiments, to avoid deflection and flipping of the vibrating member 420 during movement in an axial direction (a direction perpendicular to a plane in which the vibrating member 420 is located), the first rod 431, the second rod 432, the third rod 433, and the fourth rod 434 may be symmetrically distributed relative to the vibrating member 420, i.e., the first rod 431, the second rod 432, the third rod 433, and the fourth rod 434 may form an up-down and left-right symmetrical structure with the vibrating member 420. An elastic coefficient of the vibration plate 400 along the length direction of the hollow-out region and an elastic coefficient along a flipping direction may be low, which is conducive to improving the fatigue resistance of the vibration plate.

In some embodiments, elastic coefficients (i.e., the elastic coefficient of the vibration plate along the length direction of the hollow-out region) provided by the plurality of rods for the vibrating member along the length direction of the hollow-out region may be within a range of 50 N/m-70,000 N/m. The elastic coefficient of the vibration plate along the length direction of the hollow-out region may be determined as follows. The ring structure of the vibration plate (e.g., the vibration plate shown in FIG. 1, FIG. 11, FIG. 14, or FIG. 16) may be fixed, a constant force Ft along the length direction of the hollow-out region may be applied to the vibrating member, a displacement u of any point (e.g., a center point) on the vibrating member along the length direction of the hollow-out region may be determined, the elastic coefficient of the vibration plate along the length direction of the hollow-out region may be expressed by k, then it may be determined that $k=Ft/u$. By such an arrangement, a magnetic circuit system may be ensured not to touch a housing or a voice coil of a bone conduction earphone along the length direction of the hollow-out region under the action of gravity, which ensures that the bone conduction earphone has a better sound quality. In some embodiments, the elastic coefficients provided by the plurality of rods for the vibrating member along the length direction (i.e., the elastic coefficient of the vibration plate along the length direction of the hollow-out region) may be within a range of 7000 N/m-20,000 N/m. In some embodiments, the elastic coefficients provided by the plurality of rods for the vibrating member along the length direction (i.e., the elastic coefficient of the vibration plate along the length direction of the hollow-out region) may be within a range of 10000 N/m-20000 N/m, which may ensure that the vibration plate has a better fatigue resistance. In some embodiments, the elastic coefficients along the length direction provided by the plurality of rods for the vibrating member (i.e., the elastic coefficient of the vibration plate along the length direction of the hollow-out region) may be within a range of 40000 N/m-70000 N/m, which may provide the vibration plate with a better impact resistance while ensuring a good sound quality of the bone conduction earphone.

The elastic coefficient of the vibration plate in the axial direction (the direction perpendicular to the plane in which the vibration plate is located) may be correlated with the sound quality of the bone conduction earphone. To improve the sound quality of the corresponding bone conduction earphone and a sensitivity of the bone conduction earphone at a low frequency, in some embodiments, a range of an elastic coefficient provided by a rod for the vibration plate may be $(2\pi f_0)^2$ m, wherein m denotes a mass of the magnetic circuit in the bone conduction earphone, and $f_0$ denotes a resonance frequency of the bone conduction earphone at a low frequency. In some embodiments, a vibration frequency response curve of the vibration plate may have a resonant peak in a frequency range of 50 Hz-2000 Hz when vibrating along a direction perpendicular to a plane of the vibration plate. The resonant peak may make the vibration plate have a substantially flat trend within the vibration frequency response curve beyond the resonant peak in the frequency range of 50 Hz-2000 Hz, which ensures that the corresponding bone conduction earphone has a better sound quality. In addition, the resonant peak may enable the corresponding bone conduction earphone to have a better sensitivity in the frequency range of 50 Hz-2000 Hz.

In some embodiments, a connection region connecting each of the plurality of rods and the vibrating member or the ring structure may be or have a rounded corner. The rounded corner refers to a rounded corner formed at a connection region connecting two sides of a rod in the width direction of the rod with the vibrating member or the ring structure. In some embodiments, the rounded corners formed at the connection region connecting two sides of the rod in the width direction of the rod with the vibrating member or the ring structure may include a first rounded corner and a second rounded corner. For example, an angle formed by one side of the width direction of the rod with the vibrating member is a first rounded corner, and an angle formed by another side of the rod is a second rounded corner. In some embodiments, the first rounded corner may be the same or different from the second rounded corner. By setting the rounded corner, stresses may be avoided from being concentrated at the connection region connecting the rod and the vibrating member or the ring structure, to reduce a risk of fracture at the connection region. In some embodiments, the elastic coefficient of the vibration plate along the length direction of the hollow-out region may be reduced by setting a radius of the rounded corner to be relatively small, thereby improving the fatigue resistance of the vibration plate. In some embodiments, a small rounded corner may cause a relatively low count of fatigue failure cycles of the vibration plate under a load along the length direction of the hollow-out region. Therefore, when designing the radius of the rounded corner, it is necessary to consider a relationship among the elastic coefficient of the vibration plate along the length direction of the hollow-out region, the count of fatigue failure cycles of the vibration plate under the load along the length direction of the hollow-out region, and the radius of the rounded corner. In some embodiments, the radius of the first rounded corner may be within a range of 0.2 mm-0.7 mm and the radius of the second rounded corner may be within a range of 0.1 mm-0.3 mm. Preferably, the first rounded corner may have a radius of 0.3 mm-0.6 mm and the second rounded corner may have a radius of 0.15 mm-0.25 mm. Merely by way of example, the radius of the first rounded corner may be 0.4 mm and the radius of the second rounded corner may be 0.2 mm. By setting the rounded corner, the vibration plate may be ensured to have a relatively low elastic coefficient along the length direction of the hollow-out region and may be subjected to a relatively high count of fatigue failure cycles under the load along the length direction of the hollow-out region.

In some embodiments, to reduce deflection or even flipping of the vibration plate when the vibrating member vibrates in the direction perpendicular to the plane in which the vibration plate is located, the position, the length, and the count of curved portions of the rod may be adjusted to balance moments of the rod acting on the vibration plate. By such a setting, when the vibrating member vibrates in the direction perpendicular to the plane in which the vibration plate is located, a difference between a maximum displacement value of a surface of the vibrating member and a minimum displacement value of the surface of the vibrating member in the direction perpendicular to the plane in which the vibrating member is located is less than 0.3 mm. From the above descriptions (e.g., FIG. 5D and its related descriptions), it may be seen that the load along the flipping direction may also one reason for the failure of the vibration plate (e.g., the fracture of the curved portion of the third rod 113), i.e., the flipping of the vibrating member may be avoided or only slight flipping of the vibrating member may occur, which reduces or avoids the load along the flipping direction, so that the vibration plate may operate in a relatively balanced state (i.e., the moments of the rod acting on the vibrating member are balanced), thereby reducing the risk of fracture of the vibration plate under the load along the flipping direction. In addition, a vibration plate having a plurality of rods with different lengths arranged asymmetrically (e.g., the vibration plate 100 shown in FIG. 1, the vibration plate 200 shown in FIG. 11, and the vibration plate 300 shown in FIG. 14) may have a high degree of stability in the length direction and the width direction of the hollow-out region, so that the vibrating member may be reduced or avoided from wobbling. Whereas a vibration plate having a plurality of rods arranged symmetrically (e.g., the vibration plate 400 shown in FIG. 16) may be susceptible to wobbling in the width direction of the hollow-out region, and the magnetic circuit system connected thereto may collide with the housing or the voice coil. It may be seen that by arranging the vibration plate having a plurality of rods with different lengths arranged asymmetrically, the magnetic circuit system may avoid wobbling and colliding with the hosing or the voice coil of the bone conduction earphone to generate a strange sound, which ensures the bone conduction earphone to have a better sound quality.

Figure 17:
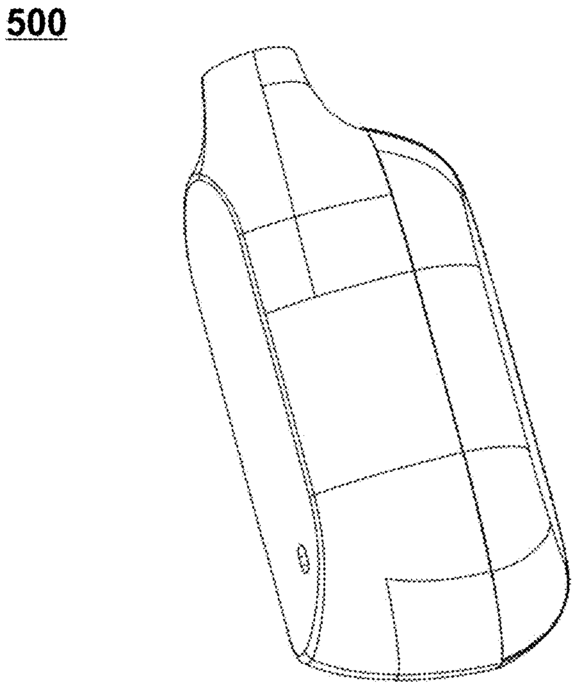
FIG. 17 is a schematic diagram illustrating an overall look of a bone conduction earphone according to some embodiments of the present disclosure.
Figure 18:
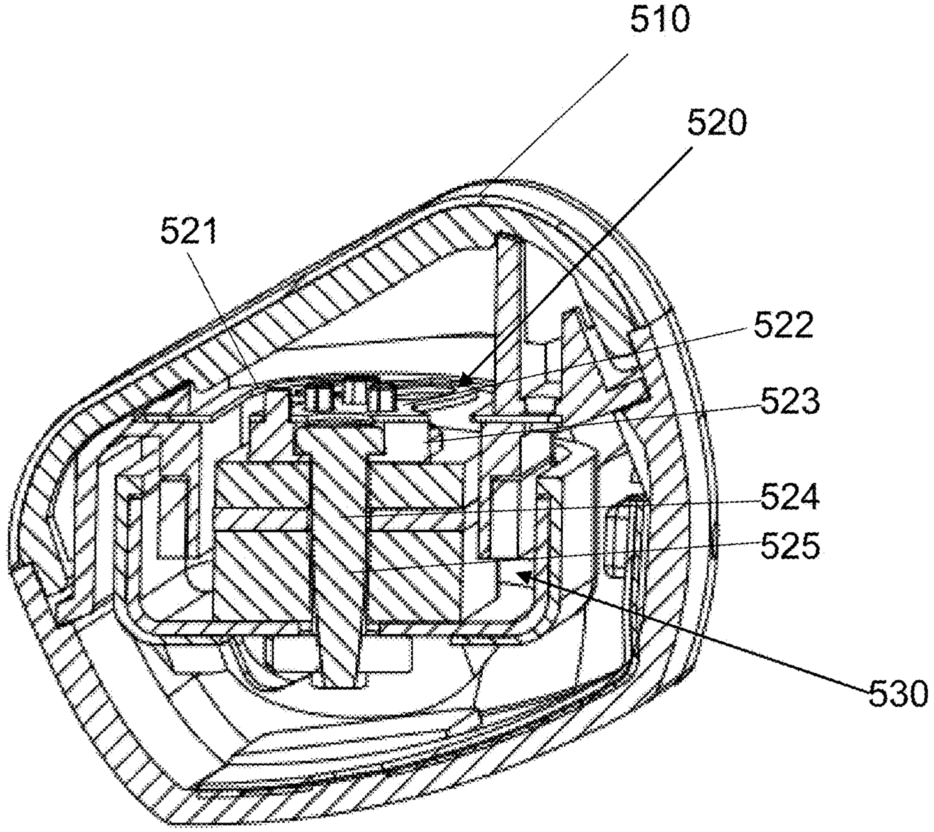
FIG. 18 is a diagram illustrating a cross-sectional view of a bone conduction earphone according to some embodiments of the present disclosure.

FIG. 17 is a schematic diagram illustrating an overall look of a bone conduction earphone according to some embodiments of the present disclosure. FIG. 18 is a diagram illustrating a cross-sectional view of a bone conduction earphone according to some embodiments of the present disclosure. In conjunction with FIG. 17 and FIG. 18, the embodiments of the present disclosure also provide a bone conduction earphone 500. The bone conduction earphone 500 may include a housing structure 510, a vibration plate 520, and a magnetic circuit structure 530. The vibration plate 520 may be a vibration plate provided in any embodiment of the present disclosure (e.g., the vibration plate 100, the vibration plate 200, the vibration plate 300, or the vibration plate 400). In some embodiments, the housing structure 510 may have an accommodating space in which the vibration plate 520 and the magnetic circuit structure 530 are located. A ring structure 521 of the vibration plate 520 may be circumferentially connected with an inner wall of the housing structure 510, and the magnetic circuit structure 530 may be connected with a vibrating member 522 of the vibration plate 520. Furthermore, the magnetic circuit structure 530 may be connected to a lower surface of the vibrating member 522. When the magnetic circuit structure 530 vibrates, the vibration may be transmitted through the vibration plate 520 to the housing structure 510, and ultimately to the auditory nerves of a user, which makes the user hear sound. In some embodiments, the lower surface of the vibrating member 522 may be provided with a connecting member 523, and the connecting member 523 and the magnetic circuit structure 530 may have a fixed connection by a bolt 524 and a nut 525, thereby realizing the connection between the vibrating member 522 and the magnetic circuit structure 530. The bone conduction earphone 500, by adopting the vibration plate provided in any of the embodiments of the present disclosure, may avoid affecting a using experience of a customer when using the product or causing the customer to return the product due to a fracture of the vibration plate under a condition that ensures good sound quality, which reduces a loss due to the return of the product by the customer.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A vibration plate, comprising:

a ring structure, a central region of the ring structure being a hollow-out region;

a vibrating member, configured to be connected to a magnetic circuit system, the vibrating member being located in the hollow-out region of the ring structure; and a plurality of rods, configured to connect the ring structure to the vibrating member, the plurality of rods being arranged at intervals along a circumferential direction of the vibrating member, wherein at least one rod in the plurality of rods includes at least two curved portions, curvature centers of the at least two curved portions are located on two sides of the at least one rod;

wherein the hollow-out region has a length direction and a width direction, and a length of each of the plurality of rods is greater than 50% of a maximum dimension of the hollow-out region along the length direction.

2. The vibration plate of claim 1, wherein the at least one rod in the plurality of rods includes at least three curved portions.

3. The vibration plate of claim 1, wherein each of the plurality of rods has a fiber structure, and an included angle between a tangent direction at a location of a region with maximum curvature on the at least one rod and an extension direction of the fiber structure is within a range of 0°-30°.

4. The vibration plate of claim 1, wherein when the vibrating member vibrates in a direction perpendicular to a plane in which the vibrating member is located, a difference between a maximum displacement value of a surface of the vibrating member and a minimum displacement value of the surface of the vibrating member is less than 0.3 mm in the direction perpendicular to the plane in which the vibrating member is located.

5. The vibration plate of claim 1, wherein the at least one rod includes a plurality of transition portions, inner normal directions corresponding to connecting portions at two ends of each of the plurality of transition portions point to two sides of the at least one rod, respectively.

6. The vibration plate of claim 5, wherein two ends of at least one transition portion are connected with the at least two curved portions of the at least one rod.

7. The vibration plate of claim 1, wherein each of the plurality of rods includes at least one curved portion having a curvature of 2-10.

8. The vibration plate of claim 1, wherein the maximum dimension of the hollow-out region is within a range of 8-20 mm along the length direction; and the maximum dimension of the hollow-out region is within a range of 3-8 mm along the width direction.

9. The vibration plate of claim 1, wherein a ratio of the maximum dimension of the hollow-out region along the length direction to the maximum dimension of the hollow-out region along the width direction is within a range of 1.5-3.

10. The vibration plate of claim 1, wherein each of the plurality of rods has a different length.

11. The vibration plate of claim 10, wherein the plurality of rods include a first rod, a second rod, and a third rod, wherein the first rod, the second rod, and the third rod are sequentially arranged at intervals along the circumferential direction of the vibrating member, a ratio of a length of the first rod to the maximum dimension of the hollow-out region along the length direction is within a range of 75%-85%, a ratio of a length of the second rod to the maximum dimension of the hollow-out region along the length direction is within a range of 85%-96%, and a ratio of a length of the third rod to the maximum dimension of the hollow-out region along the length direction is within a range of 70%-80%.

12. The vibration plate of claim 11, wherein a contact point between the first rod and the vibrating member is connected with a center of the vibrating member by a first connecting line, a contact point between the second rod and the vibrating member is connected with the center of the vibrating member by a second connecting line, a contact point between the third rod and the vibrating member is connected with the center of the vibrating member by a third connecting line, and an included angle between the first connecting line and the second connecting line or an included angle between the first connecting line and the third connecting line is greater than an included angle between the second connecting line and the third connecting line.

13. The vibration plate of claim 12, wherein the included angle between the first connecting line and the second connecting line is within a range of 100°-140°, the included angle between the second connecting line and the third connecting line is within a range of 70°-100°, and the included angle between the first connecting line and the third connecting line is within a range of 120°-160°.

14. The vibration plate of claim 1, wherein a width of each of the plurality of rods is not less than 0.25 mm.

15. The vibration plate of claim 1, wherein a width of each of the plurality of rods is not less than 0.28 mm.

16. The vibration plate of claim 1, wherein the vibration plate has a resonant peak in a frequency range of 50 Hz-2000 Hz when vibrating along a direction perpendicular to a plane of the vibration plate.

17. The vibration plate of claim 1, wherein an elastic coefficient provided by the plurality of rods to the vibrating member along a length direction is within a range of 50 N/m-70,000 N/m.

18. The vibration plate of claim 1, wherein each connection region connecting the plurality of rods and the vibrating member or the ring structure has a rounded corner.

19. A bone conduction earphone, comprising a housing structure, a magnetic circuit structure, and a vibration plate, wherein the housing structure has an accommodating space, wherein the magnetic circuit structure and the vibration plate are located within the accommodating space; and a ring structure of the vibration plate is circumferentially connected with an inner wall of the housing structure, wherein the magnetic circuit structure is connected with a vibrating member of the vibration plate, wherein the vibration plate includes:

the ring structure, a central region of the ring structure being a hollow-out region, the vibrating member, configured to be connected to the magnetic circuit system, the vibrating member being located in the hollow-out region of the ring structure, and a plurality of rods, configured to connect the ring structure to the vibrating member, the plurality of rods being arranged at intervals along a circumferential direction of the vibrating member, wherein at least one rod in the plurality of rods includes at least two curved portions, curvature centers of the at least two curved portions are located on two sides of the at least one rod;

wherein the hollow-out region has a length direction and a width direction, and a length of each of the plurality of rods is greater than 50% of a maximum dimension of the hollow-out region along the length direction.

* * * * *